United States Patent
Faith et al.

(10) Patent No.: US 11,341,515 B2
(45) Date of Patent: May 24, 2022

(54) SYSTEMS AND METHODS FOR SENSOR DATA ANALYSIS THROUGH MACHINE LEARNING

(71) Applicant: Deep Labs Inc., San Francisco, CA (US)

(72) Inventors: Patrick Faith, Pleasanton, CA (US); Matthew Quinlan, Danville, CA (US); Scott Edington, Arlington, VA (US)

(73) Assignee: Deep Labs Inc., San Francisco, CA (US)

( * ) Notice: Subject to any disclaimer, the term of this patent is extended or adjusted under 35 U.S.C. 154(b) by 0 days.

(21) Appl. No.: 16/550,818

(22) Filed: Aug. 26, 2019

(65) Prior Publication Data

US 2019/0385177 A1    Dec. 19, 2019

Related U.S. Application Data

(63) Continuation of application No. 15/810,457, filed on Nov. 13, 2017, now Pat. No. 10,395,262, which is a
(Continued)

(51) Int. Cl.
*G06Q 30/02* (2012.01)
*G06Q 50/00* (2012.01)
(Continued)

(52) U.S. Cl.
CPC ..... *G06Q 30/0201* (2013.01); *G06Q 30/0269* (2013.01); *G06Q 50/01* (2013.01);
(Continued)

(58) Field of Classification Search
CPC .................................................. G06Q 30/02
See application file for complete search history.

(56) References Cited

U.S. PATENT DOCUMENTS

2003/0126013 A1   7/2003 Shand
2007/0007331 A1*  1/2007 Jasper ....................... G07F 7/00
                                                          235/379
(Continued)

OTHER PUBLICATIONS

International Search Report dated May 19, 2017, from International Application No. PCT/US2017/028354 (3 pages).
(Continued)

*Primary Examiner* — Kurtis Gills
(74) *Attorney, Agent, or Firm* — Finnegan, Henderson, Farabow, Garrett & Dunner L.L.P

(57) ABSTRACT

Sensor data analysis may include obtaining video data, detecting facial data within the video data, extracting the facial data from the video data, detecting indicator data within the video data, extracting the indicator data from the video data, transforming the extracted facial data into representative facial data, and determining a mood of the person by associating learned mood indicators derived from other detected facial data with the representative facial data. The analysis may include determining that the representative facial data is associated with a complex profile, and determining a context regarding the person within the environment by weighting and processing the determined mood, at least one subset of data representing information about the person of the complex profile, and the indicator data. The analysis may include determining a user experience for the person, and communicating the determined user experience to a device associated with the person.

20 Claims, 19 Drawing Sheets

Related U.S. Application Data continuation of application No. 15/134,362, filed on Apr. 20, 2016, now Pat. No. 9,818,126.

(51) Int. Cl.
*G06V 40/20* (2022.01)
*G06V 40/16* (2022.01)
*G06V 20/40* (2022.01)
*G06V 40/18* (2022.01)

(52) U.S. Cl.
CPC .......... *G06V 40/172* (2022.01); *G06V 40/176* (2022.01); *G06V 40/23* (2022.01); *G06V 20/40* (2022.01); *G06V 40/161* (2022.01); *G06V 40/18* (2022.01)

(56) References Cited

U.S. PATENT DOCUMENTS

| | | |
|---|---|---|
| 2008/0147488 A1 | 6/2008 | Tunick et al. |
| 2009/0285456 A1 | 11/2009 | Moon et al. |
| 2011/0060652 A1 | 3/2011 | Morton |
| 2012/0124456 A1* | 5/2012 | Perez .................. G06Q 30/06 715/200 |
| 2012/0268241 A1* | 10/2012 | Hanna .............. G06Q 20/40145 340/5.52 |
| 2013/0218687 A1 | 8/2013 | Sohangir et al. |
| 2014/0067679 A1 | 3/2014 | O'Reilly et al. |
| 2014/0108324 A1* | 4/2014 | Chen .................. G06F 17/18 706/52 |
| 2014/0130076 A1 | 5/2014 | Moore |
| 2014/0310056 A1 | 10/2014 | Alapati et al. |
| 2015/0006390 A1 | 1/2015 | Aissi et al. |
| 2015/0073987 A1 | 3/2015 | Dutt |
| 2015/0213421 A1 | 7/2015 | Block et al. |

OTHER PUBLICATIONS

Written Opinion dated May 19, 2017, from International Application No. PCT/US2017/028354 (8 pages).
Office Action from Intellectual Property Office of Singapore in counterpart application No. 10202006887U, dated Jan. 15, 2021 (2 pages).
Extended European Search Report in counterpart application No. 17786547.4, dated Jun. 30, 2020.

* cited by examiner

SYSTEMS AND METHODS FOR SENSOR DATA ANALYSIS THROUGH MACHINE LEARNING

CROSS-REFERENCE TO RELATED APPLICATIONS

This is a continuation of U.S. application Ser. No. 15/810,457, filed Nov. 13, 2017, which is a continuation of U.S. application Ser. No. 15/134,362, filed Apr. 20, 2016 (now U.S. Pat. No. 9,818,126), which are incorporated herein by reference.

BACKGROUND

The present disclosure generally relates to data learning and big data analytics. More particularly, and without limitation, the present disclosure relates to systems and methods for identity management through machine learning, hierarchical learning, or structured learning.

Advances in data analytics have been driven by improvements in mobile and cloud computing, sensor technology, and computer vision. Such advances may be leveraged in a number of different ways, and may be used to provide better automated decision making in numerous different contexts. For example, consumers may be provided with improved service and retail experiences, patients at hospitals may be given improved treatment, and public utilities may be operated with greater efficiency.

However, challenges may arise when collecting and storing large amounts of electronic data. One challenge involves the scalability of data analytics systems. For example, an entity that has deployed a data analytics system at one location and wants to deploy additional data analytics systems at other locations may run into issues with integrating the multiple deployed systems and the data they collect.

Another challenge relates to managing the collected data, quickly analyzing it to gain an understanding of its importance, and using it in a meaningful way. For example, conventional data analytics systems may collect large amounts of data for a retail property owner and/or a retailer pertaining to the behavior and activity of their customers (and potential customers) but may not be able to quickly synthesize the collected data so that effective and timely decisions can be made. Moreover, the retailer and/or property owner may not understand how all the collected data fits together to form a context of a customer's preferences, habits, and behavior.

SUMMARY

Consistent with the present disclosure, computer-implemented systems and methods are provided sensor data analysis. Data may be collected through various sensors and databases to construct complex profiles that may be associated with persons. The complex profiles and real-time collected video and/or audio data may be used to perform engagement tracking and to determine appropriate interaction with the person. Accordingly, the disclosed systems and methods are capable of providing the person with a far more personalized and tailored experience.

Consistent with the present disclosure, computer-implemented systems and methods are also provided for data driven trend analysis through machine learning. Data may be collected from one or more data sources and utilized to provide a myriad of predictions, alerts, and commands in a variety of different applications and fields.

According to one exemplary embodiment, a system is provided for sensor data analysis. The system may include a memory that stores a set of instructions and at least one processor in communication with the memory for executing the set of instructions. The at least one processor may execute the instructions to obtain video data from at least one camera in an environment and detect facial data within the video data, wherein the facial data may be associated with a person in the environment. The at least one processor may execute the instructions to extract the facial data from the video data and detect indicator data within the video data, wherein the indicator data may be associated with the environment. The at least one processor may execute the instructions to extract the indicator data from the video data and transform the extracted facial data into representative facial data, wherein the transforming may comprise determining at least one subset of the extracted facial data that corresponds to a likelihood of identifying the person, determining that the likelihood of identifying the person exceeds a predetermined threshold, and selecting the at least one subset of the extracted facial data as the representative facial data. The at least one processor may execute the instructions to determine a mood of the person by associating learned mood indicators derived from other detected facial data with the representative facial data. The learned mood indicators may be dynamically adjusted as an amount of the other detected facial data changes, and may execute the instructions to determine whether the representative facial data is associated with a complex profile. The complex profile may include at least one subset of data representing information about the person gathered from a plurality of databases, and the complex profile may be updated in real-time from the plurality of databases. The at least one processor may execute the instructions to determine a context regarding the person within the environment by weighting and processing the determined mood, the at least one subset of data representing information about the person of the complex profile, and the indicator data extracted from the video data. The at least one processor may execute the instructions to determine a user experience for the person. The user experience is determined by associating the determined context with at least one stored user experience, wherein the stored user experience is modified based on analysis of the determined context, and the at least one processor may execute the instructions to communicate the determined user experience to a device associated with the person.

The at least one processor may further execute instructions to update the complex profile by recording at least one of the extracted indicator and the determined mood to the complex profile. The at least one processor may determine that the representative facial data is not associated with a complex profile, and generate a complex profile. Generating the complex profile may include collecting personal data about the person from at least one server, wherein the personal data may include information from at least one social media profile. The at least one processor may further execute instructions to detect the person within the video data, detect at least one other person within the video data, and determine that the person is grouped with the at least one other person. The at least one processor may further execute instructions to determine a gaze direction from the extracted facial data, and determining the context regarding the person further may include processing the determined gaze direction. The at least one processor may further execute instructions to determine a movement of the person within the video data, and determining the context regarding the person may further include processing the determined movement.

The user experience may include a discount at a retail store located within a predetermined distance of a location of the person. The at least one processor may further execute instructions to detect an object within the video data, and determine an advertisement related to the detected object, and the user experience determined for the person may include the advertisement.

According to one exemplary embodiment, a computer-implemented method may be provided for sensor data analysis. The method may include obtaining video data from at least one camera in an environment and detecting facial data within the video data, wherein the facial data may be associated with a person in the environment. The method may include extracting the facial data from the video data and detecting indicator data within the video data, wherein the indicator data may be associated with the environment. The method may include extracting the indicator data from the video data and transforming the extracted facial data into representative facial data. The transforming may include determining at least one subset of the extracted facial data that corresponds to a likelihood of identifying the person, determining that the likelihood of identifying the person exceeds a predetermined threshold, and selecting the at least one subset of the extracted facial data as the representative facial data. The method may include determining a mood of the person by associating learned mood indicators derived from other detected facial data with the representative facial data, and the learned mood indicators may be dynamically adjusted as an amount of the other detected facial data changes. The method may include determining that the representative facial data is associated with a complex profile, the complex profile may include at least one subset of data representing information about the person gathered from a plurality of databases, and the complex profile may be updated in real-time from the plurality of databases. The method may include determining a context regarding the person within the environment by weighting and processing the determined mood, the at least one subset of data representing information about the person of the complex profile, and the indicator data extracted from the video data. The method may include determining a user experience for the person by associating the determined context with at least one stored user experience, wherein the stored user experience may be modified based on analysis of the determined context. The method may include communicating the determined user experience to a device associated with the person.

According to yet another exemplary embodiment, a non-transitory computer readable medium storing one or more programs is provided, where the one or more programs may include instructions, which, when executed by a processor of a computer, cause the computer to perform a method comprising obtaining video data from at least one camera in an environment and detecting facial data within the video data, wherein the facial data may be associated with a person in the environment. The computer readable medium may provide extracting the facial data from the video data and detecting indicator data within the video data, wherein the indicator data may be associated with the environment. The computer readable medium may provide extracting the indicator data from the video data and transforming the extracted facial data into representative facial data. The transforming may include determining at least one subset of the extracted facial data that corresponds to a likelihood of identifying the person, determining that the likelihood of identifying the person exceeds a predetermined threshold, and selecting the at least one subset of the extracted facial data as the representative facial data. The computer readable medium may provide determining a mood of the person by associating learned mood indicators derived from other detected facial data with the representative facial data. The learned mood indicators may be dynamically adjusted as an amount of the other detected facial data changes. The computer readable medium may provide may include determining that the representative facial data is associated with a complex profile. The complex profile may include at least one subset of data representing information about the person gathered from a plurality of databases, and the complex profile may be updated in real-time from the plurality of databases. The computer readable medium may provide may include determining a context regarding the person within the environment by weighting and processing the determined mood, the at least one subset of data representing information about the person of the complex profile, and the indicator data extracted from the video data. The computer readable medium may provide determining a user experience for the person by associating the determined context with at least one stored user experience. The stored user experience may be modified based on analysis of the determined context. The computer readable medium may provide communicating the determined user experience to a device associated with the person.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Further, the claims should be regarded as including such equivalent constructions insofar as they do not depart from the spirit and scope of the present disclosure.

BRIEF DESCRIPTION OF THE DRAWINGS

Reference will now be made to the accompanying drawings, which illustrate exemplary embodiments of the present disclosure and in which.

DETAILED DESCRIPTION OF EXEMPLARY EMBODIMENTS

Figure 1A:
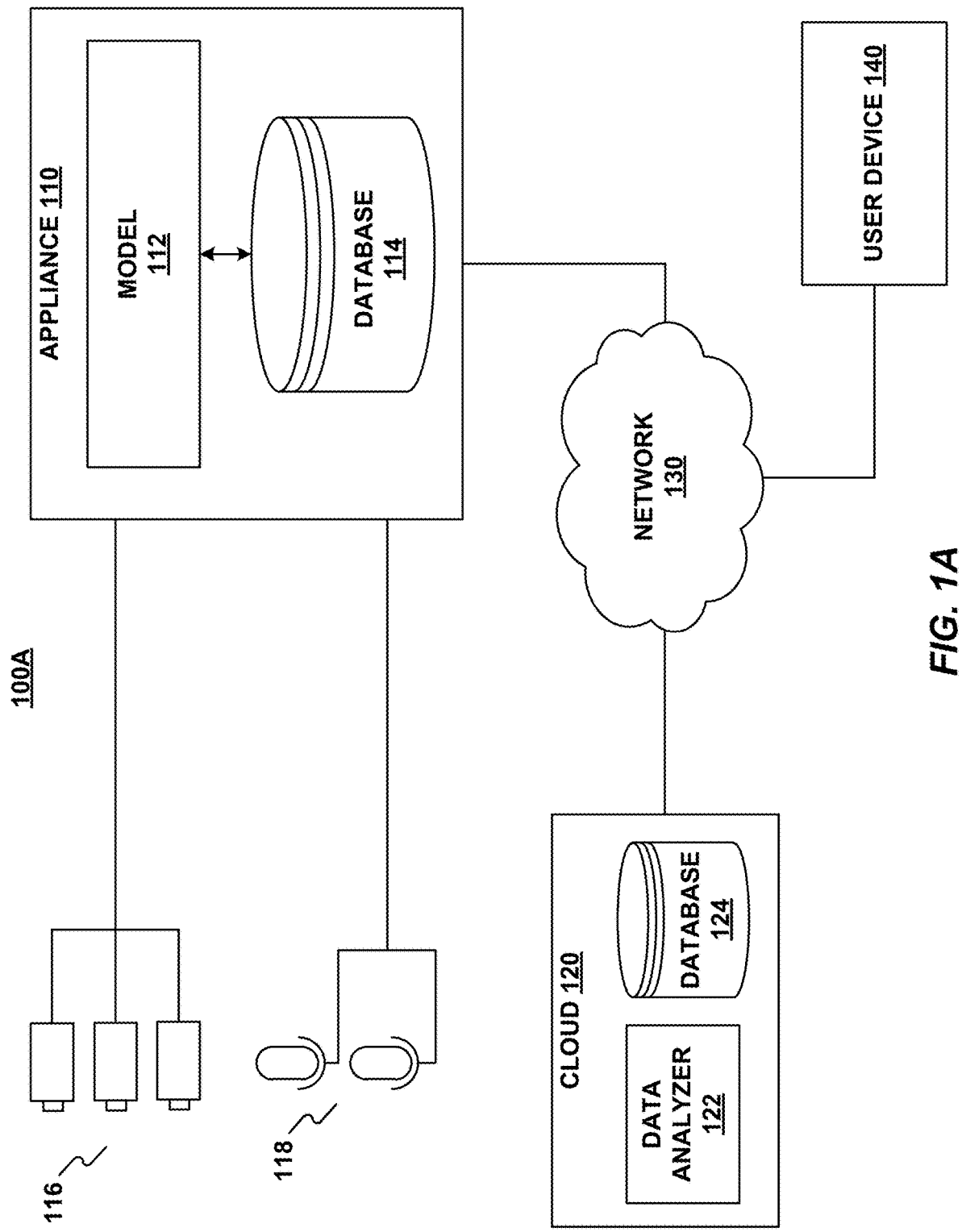
FIG. 1A is a block diagram of an exemplary system environment for identity management, consistent with embodiments of the present disclosure.

The disclosed embodiments relate to systems and methods for identity management through machine learning. The identity management systems and methods are designed to receive large amounts of a myriad of types of data and to synthesize the data in real time to build complex profiles of target people in an environment, such as customers, potential customers, occasional customers, passers-by, frequent customers, very important customers, people that may be security risks, and others. The data used to build complex profiles may be collected through various types of sensors and may be received at the identity management platform. Each person in an environment may be a target person. For example, data may be gathered for every person within an environment, and complex profiles may be generated and/or managed for each person. Alternatively, only certain people in an environment may be a target person. Complex profiles may thus be generated and/or managed for only certain people within an environment. Using, for example, video and/or audio recognition techniques, only certain people in an environment may be identified as target people, and only these people may have their complex profiles generated and/or managed. For example, in a store environment, both store clerks and customers may be present. The identity management system may differentiate between store clerks and customers using video and/or audio recognition technologies, and only manage and/or generate a complex profile for customers. Alternatively, a person may have certain privacy settings enabled for collection of their date. Accordingly, the identity management systems according to the present disclosure may determine that one or more people in an environment have privacy settings that restrict generation and/or management of a complex profile related to them.

Each complex profile associated with a target person may include a robust set of characteristics of the target person, including the target person's preferences (and dislikes), habits, relationships with other people, past behavior in various contexts, and other data. Complex profiles may be augmented with social media platform data by identifying social media profiles associated with each person using the data collected from the sensors.

Once a complex profile for a target person has been created, the identity management systems and methods may receive real-time data collected from one or more sensors and use the real-time data in conjunction with the complex profile to interact with the target person in various ways. The received real-time data may be analyzed as it is collected and cross-referenced with the various characteristics included in the target person's complex profile to offer the person a far more personalized and tailored in-store experience. For example, the identity management system may receive live video feed data collected from one or more cameras installed in a store in which a target person is browsing products. The identity management system may analyze the target person's face in the video feed to determine, for example, that the target person has been looking at a watch in a display case for the past two minutes. In this example, the identity management system may identify the watch brand and model from the store's product database and determine that the target person looking at the watch has purchased two other watches from the same brand in the past six months. The identity management system may check the target person's social media profiles to determine if the target person has discussed or mentioned a desire to go watch shopping or specific plans to go watch shopping at a particular time or at a time in the near future. Such information obtained through the target person's social media profiles may increase the system's confidence that the target person is shopping for himself. The identity management system may therefore decide to offer the user a promotion (e.g., a coupon or discount) to the target person's mobile device based on the target person's shopping context created using the person's complex profile, social media data, and the real-time video feed analysis.

While the previous example pertained to a person's shopping experience, the disclosed identity management systems and methods are capable of providing personalized and tailored experiences in a variety of contexts, such as, hospitals, banks, airports, expo and entertainment venues, department stores and malls, sporting events, etc. Moreover, the disclosed identity management systems and methods are capable of assessing security risks (e.g., determining whether a person may be considering stealing from a store) and providing marketing and advertising models both in store and at other locations.

The disclosed identity management systems and methods are also capable of efficient scaling to meet user and administrator needs. For example, the disclosed identity management systems and methods may be installed at an initial (or a handful of) client location(s), such as a store in a shopping mall. Additional identity management systems may then be phased in at other client locations and managed at a central location or through cloud-based technologies. Moreover, data collection capabilities at client locations may be easily expanded through the addition of video cameras and microphones. The additional data may be easily managed and provided to the central location or cloud-based location for further analysis, and decisions on user experience personalization may be provided to the individual client locations for presentation to clients.

Reference will now be made in detail to exemplary embodiments, the examples of which are illustrated in the accompanying drawings. Whenever possible, the same reference numbers will be used throughout the drawings to refer to the same or like parts.

FIG. 1A is a block diagram of an exemplary system environment 100 for identity management, consistent with embodiments of the present disclosure. As shown in FIG. 1A, system environment 100 includes a number of components such as an appliance 110 and a cloud 120. It will be appreciated from this disclosure, however, that the number and arrangement of these components is exemplary only and provided for purposes of illustration. Other arrangements and numbers of components may be utilized without departing from the teachings and embodiments of the present disclosure. For example, appliance 110 may interact with any number of clouds 120 or vice versa.

In some embodiments, appliance 110 may receive real-time collected data, manage complex profiles, and make user experience personalization decisions based on analysis of the data, complex profiles, and other information. The real-time data may be collected through various types of sensors. For example, real-time video data may be collected at cameras 116 and real-time audio data may be collected at microphones 118. Cameras 116 may include one or more cameras. Microphones 118 may include one or more microphones.

Cameras 116 may be implemented using various types of cameras. For example, cameras 116 may be two-dimensional cameras or three-dimensional cameras that are capable of collecting depth data. Cameras 116 may be motion tracking cameras that are capable of tracking moving people, animals, or objects within a viewable field of camera 116. Cameras 116 may be thermal cameras or infrared (IR) cameras. Cameras 116 may be internet protocol (IP) cameras capable of transmitting video feed data across a network to appliance 110 or cloud 120. Cameras 116 may be omnidirectional cameras capable of capturing 360 degree video of an environment. Cameras 116 may capture video feed data in standard definition video quality, high definition video quality, or any other video quality.

Microphones 118 may be implemented using various types of microphones. For example, microphones 118 may be miniature microphones that are concealed within an environment. Microphones 118 may be 360 degree microphones that capture audio from 360 degrees of the surrounding environment. Microphones 118 may be internet protocol (IP) microphones capable of transmitting audio feed data across a network to appliance 110 or cloud 120. Microphones 118 may capture audio feed data in standard definition audio quality, high definition audio quality, or any other audio quality.

The real-time data may also be collected via other sources, such as databases and other systems. For example, real-time data may be collected from relational databases, non-relational databases (e.g., NoSQL), graph databases, HDFS systems, and plain text (e.g., XML, JSON, CSV, or unstructured content) databases.

Appliance 110 may use the collected real-time data to generate and maintain complex profiles associated with one or more persons in an environment, and may store the complex profiles in database 114. The real-time data may be in structured or unstructured format. For example, appliance 110 may include a model 112. Model 112 may be pre-stored in Appliance 110, and may be tailored to various use cases and industry verticals. Model 112 may analyze the video data collected at cameras 116 to identify one or more target persons included in the video feed. The one or more target person or persons may be identified by using facial detection techniques and comparing the detected face to faces included in one or more pictures and/or video feeds stored in database 114 and associated with existing complex profiles to determine if the target person or persons in the video feed match any complex profiles. Alternatively, image vectors may be utilized to determine whether the target person or persons are associated with existing complex profiles. A face match confidence regarding whether a person or persons in a video feed are associated with an existing complex profile may be determined. If the determined face match confidence is above a predetermined threshold, it may be determined that the target person is associated with an existing complex profile. If the determined face match confidence is not above a predetermined threshold, it may be determined that the target person or persons are not associated with any existing complex profiles. Accordingly, model 112 may generate new complex profiles for the target person or persons in the video feed when it is determined that the target person or persons are not associated with any existing complex profiles.

In a similar fashion, model 112 may compare audio feeds collected from microphones 118 to audio recordings stored in database 114 and associated with existing complex profiles. An audio match confidence regarding whether the target person or persons in an audio feed are associated with an existing complex profile may be determined based on the similarity between the compared audio feeds. A determined audio match confidence may be above a predetermined threshold if the audio signature of the target person or persons' voices in the audio feed match any audio signatures in an audio recording, and it may be determined that that the target person or persons in the audio feed are associated with particular complex profiles. Alternatively, a determined audio match confidence may be below a predetermined threshold if the audio signature of the target person or persons' voices in the audio feed do not match with any audio signatures in an audio recording, and it may be determined that the target person or persons in the audio feed are not associated with particular complex profiles. Accordingly, model 112 may generate new complex profiles for the target person or persons in the audio feed when it is determined that the target person or persons are not associated with any existing complex profiles.

Face match and audio match confidences may be utilized to form a profile match confidence. The profile match confidence may be adjusted based on the face match and audio match confidences. Depending on these values, the profile match may be determined as above or below a predetermined threshold. If the profile match confidence is above a predetermined threshold, it may be determined that the target person or persons whose video and audio feed data are captured are associated with particular complex profiles. Alternatively, if the profile match confidence is below a predetermined threshold, it may be determined that the target person or persons in whose video and audio feed data are captured are not associated with particular complex profiles, and that model 112 should generate new complex profiles.

When building a target person's new complex profile, model 112 may use the collected video and/or audio to crawl the Internet (or other networks) to attempt to identify the target person using social media content associated with the target person. For example, model 112 may compare a face identified in a collected video feed to faces included in pictures associated with various social media user profiles to determine if there is a match. Model 112 may assign a confidence score to the determination and may improve the confidence score through corroborating matches on additional social networks.

Model 112 may also use collected data to crawl complex profiles stored in database 114 to attempt to identify the target person. For example, a complex profile of another person may include a list of persons that the other person associates with (e.g., friends, family, relatives, co-workers, etc.). The target person may be identified through matching aspects collected data with persons associated with the other person based on their identify profile.

In some embodiments, model 112 may identify and filter out one or more target persons in a video feed that should not have complex profiles. For example, a model 112 may be configured to identify store employees and filter out store employees from complex profile management. Model 112 may perform such identification via facial analysis of people in the store environment. For example, facial data of store employees (images or image vectors) may be stored in database 114, and model 112 may use facial analysis to recognize store employees. Accordingly, when a store employee's face is recognized in an environment, model 112 may determine that the store employee is not a target person, and should not have a complex profile searched for or generated. This analysis of facial data by model 112 may be turned on and off as needed. For example, while an employee is working, model 112 may determine that the store employee is not a target person. However, once the store employee clocks out of work or has their shift end, model 112 may determine that the store employee is a target person.

Once the identity of the target person associated with the new complex profile has been established, the new complex profile may be augmented with additional characteristics of the target person. In some embodiments, model 112 may analyze the collected data to establish the target person's behavioral patterns. For example, model 112 may determine through collected video data that the target person routinely visits a coffee shop before entering a grocery store to conduct their grocery shopping every Saturday morning. As another example, cameras 116 installed at the entrance of a shopping mall may be used by model 112 to determine that the target person routinely parks on the south side of the mall when the target person visits the mall to shop.

Another example of data that can be used to augment complex profiles is mood information associated with the target person. Model 112 may analyze the target person's body language in video feeds (e.g., their facial expressions, whether they are pacing or walking at a leisurely pace, arm and hand placement, etc.) and/or voice characteristics in audio feeds (e.g., intonation, speed, inflection, etc.) to determine, for example, whether the user is happy, stressed, anxious, content, or any other state of emotional being.

Model 112 may also augment complex profiles with additional social media data. For example, model 112 may add relationship information (e.g., the target person's friends and family), their likes and preferences (e.g., a list of music artists/albums they like, a list of their favorite movies, etc.), and other information associated with the target person.

Additional data that may be added to a target person's complex profile include purchase history, the target person's age, their dressing style, their current location, an indicator of their shopping frequency (e.g., how frequently they visit a particular store, the average duration of their stay in the store, etc.). Each complex profile may also be assigned an identifier such as an ID number.

Once a complex profile has been determined to be associated with a target person in a video and/or audio feed, model 112 may perform real-time engagement tracking. Engagement tracking may include identifying the target person's consumer interests, in-store engagements with products and displays, measuring customer satisfaction and responses (e.g., responses to a product or display window), or measuring their receptiveness to direct or indirect engagement (e.g., whether the target person would be receptive to engagement with a Sales Clerk, personalized offers or discounts, etc.). Moreover, the video and/or audio feed may be used to classify relationships of groups of customers visiting a client location together.

Model 112 may utilize the analysis it performs to provide various analytic functions, such as fraud detection, authentication, and/or targeted advertising. Model 112 may further utilize its analysis for other analytic functions as specified by an operator.

In some embodiments, appliance 110 may use the target person's complex profile, engagement tracking data, and sensor data obtained and analyzed by model 112 to interact with the target person via the target person's user device 140. User device 140 may have a virtual assistant application installed thereon to which appliance 110 may communicate. For example, appliance 110 may transmit discounts, coupons, or recommendations to the target person based on their complex profile, engagement tracking data, and sensor data. The target person may provide input to the virtual assistant application, such as indicating what the target person is searching for, where the target person wants to go, what the target person wants to accomplish, etc. The target person's input may be sent by user device 140 to appliance 110, so that model 112 of appliance 110 may analyze the input and determine how to respond.

Model 112 may respond by generating various types of outputs. For example, model 112 may generate an navigation instructions to a shoe store in response to the target person's input specifying a desire to go shoe shopping (in addition to information regarding the target person's favorite shoe stores from the target person's complex profile in model 112). As another example, model 112 generate a notification of a restaurant's breakfast, brunch, lunch, happy hour, or dinner specials in response to the target person's input indicating that the target person is hungry (and in addition to information regarding the target person's most frequented restaurants from the target person's complex profile in model 112). Appliance 110 may transmit generated outputs to user device 140. The target person may accept the generated outputs, such as suggestions/recommendations, via interaction with the virtual assistant application of user device 140. Model 112 may update the target person's complex profile information based on the target person's interaction.

Appliance 110 may accept a variety of disparate kinds of structured and unstructured data, and may interface with components that provide such different kinds of data. For example, appliance 110 may interface with sensor devices that provide data encoded according to numerous different data standards and/or formats, and data encrypted with various different security protocols. For example, data from camera 116 may be encoded according to a data standard that may be an obsolete standard that is not currently in widespread industry use, a new standard that is yet to be fully adopted by industry, or a standard that may be in widespread industry use. Appliance 110 may be programmed to recognize all of these standards, and may, seamlessly interface with data provided in these standards.

To provide this interface, appliance 110 may convert sensor data it receives (for example, from camera 116 and microphone 118) into an appliance data format via normalization. For example, appliance 110 may collect sensor data in numerous different data formats from numerous different cameras 116 and microphones 118. Appliance 110 may then normalize this sensor data into the appliance data format for processing and analysis by appliance 110.

Configuration files may be uploaded to appliance 110. Configuration files may specify the kind of data that is to be collected by sensor devices, such as camera 116 and/or microphone 118, and the kind of processing appliance 110 should perform. Configuration files may additionally specify which sensor devices of a plurality of sensor devices are to collect information for analysis by appliance 110, or which data already collected being collected by sensor devices 116 and 118 is to be sent to appliance 110.

In some embodiments, the data collected by the sensors (e.g., cameras 116 and microphone 118) may be too voluminous to store locally at appliance 110. Instead, appliance 110 may transmit portions of the collected data to cloud 120 for storage in database 124. Moreover, engagement tracking operations and output analysis may be too computationally intense to perform at appliance 110. applicant 110 may not have the processing power to accurately analyze sensor data in real time. Instead, appliance 110 may notify cloud 120 that cloud 120 should receive some or all of the sensor data regarding the environment, and perform some or all of the analysis of the sensor data. Data analyzer 122 may then perform the tracking and analysis, and may provide the output to appliance 110 for forwarding on to the target person's user device 140. Accordingly, cloud 120 may perform the same processes as appliance 110. Cloud 120 may be capable of providing such processing on a larger scale with larger amounts and types of data compared to appliance 110. Thus, the processing capability of system environment 100 may be increased without increasing the installation footprint at the client location.

Moreover, one or more clouds 120 may communicate with one or more appliances 110. As will be described, one or more of clouds 120 may be configured as public clouds, and one or more of clouds 120 may be configured as private clouds.

Databases 114 and 124 may include one or more logically and/or physically separate databases configured to store data. The data stored in databases 114 and/or 124 may be received from appliance 110, from cloud 120, and/or may be provided as input using conventional methods (e.g., data entry, data transfer, data uploading, etc.). The data stored in databases 114 and/or 124 may take or represent various forms including, but not limited to, recorded data (e.g., recorded audio and video), complex profiles, social media content, websites and cached webpages, client data (e.g., product lists, store inventories, sales data, promotion data, and a variety of other electronic data or any combination thereof). In some embodiments, databases 114 and 124 may be included in a single database.

In some embodiments, databases 114 and 124 may be implemented using any suitable form of a computer-readable storage medium. In some embodiments, databases 114 and 124 may be maintained in a network attached storage device, in a storage area network, or combinations thereof, etc. Furthermore, databases 114 and 124 may be maintained and queried using numerous types of database software and programming languages, for example, SQL, MySQL, IBM DB2®, Microsoft Access®, PERL, C/C++, Java®, etc. Although FIG. 1 shows database 114 associated with appliance 110 and database 124 associated with cloud 120, databases 114 and/or 124 may be standalone databases that are accessible to appliance 110, cloud 120, user device 140, and/or other components via network 130.

Network 130 may include any combination of communications networks. For example, the network may include the Internet and/or any type of wide area network, an intranet, a metropolitan area network, a wired or wireless local area network (LAN) (e.g., WiFi), a cellular communications network, a direct connection (e.g., Bluetooth, near-field communication (NFC), WiFi Direct), etc.

Figure 1B:
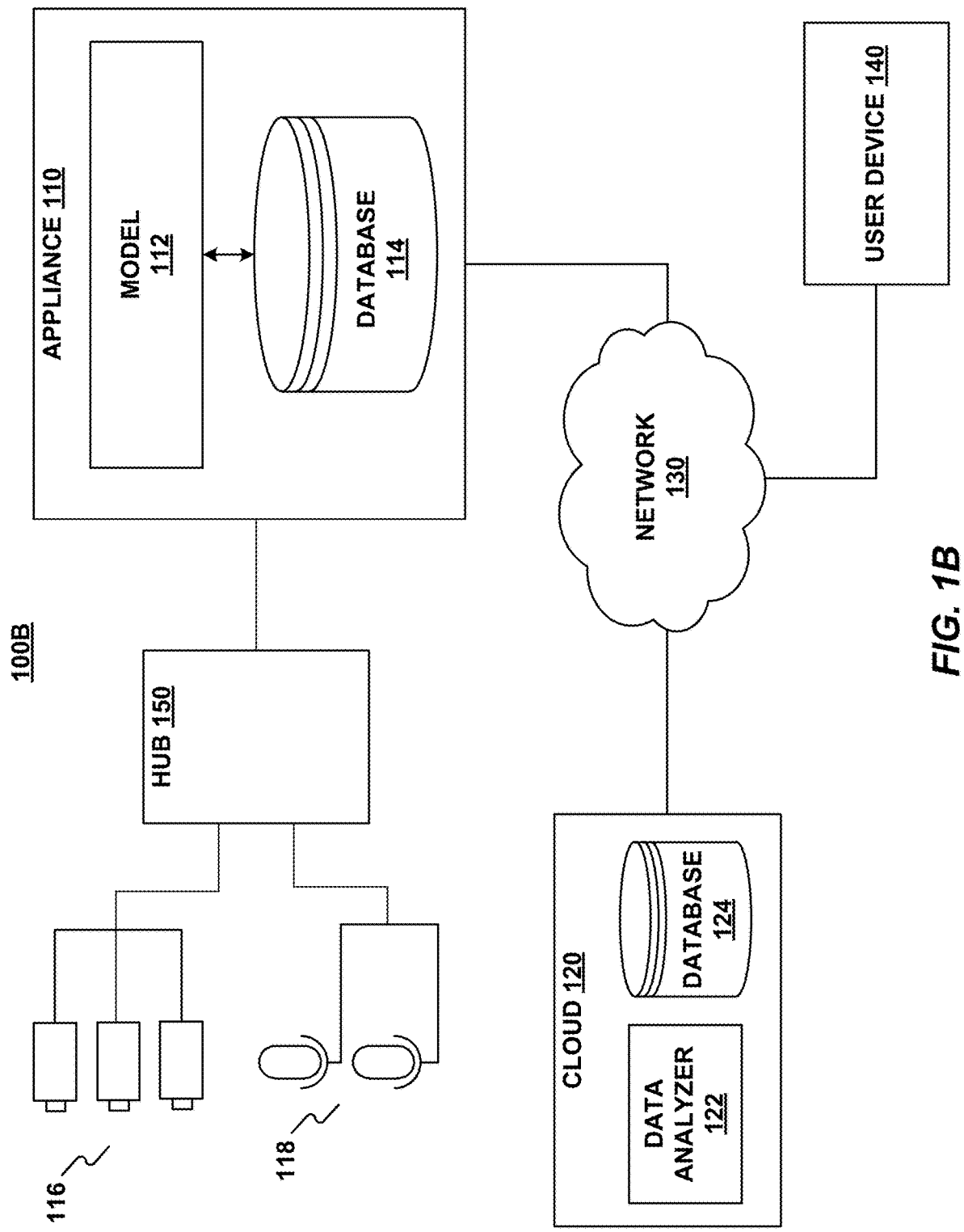
FIG. 1B is a block diagram of an exemplary system environment for identity management, consistent with embodiments of the present disclosure.

FIG. 1B shows a modification to system environment 100A as shown in FIG. 1A. As shown in FIG. 1B, system environment 100A may be modified to include hub 150 as an intermediary between sensor devices and appliance 110, providing system environment 100B. Hub 150 may act as an intermediate unit that collects sensor data from cameras 116, microphones 118, and/or any other sensors that it is connected to and/or communicates with, and provide the sensor data to appliance 110. Hub 150 may provide pre-processing that extracts features from sensor data (e.g., faces from video or image data, voices from audio data) and provide such extracted features to appliance 110. This pre-processing may reduce the amount of processing that appliance 110 and/or cloud 120 perform. Moreover, a user may control how hub 150 interfaces with appliance 110. For example, a user may specify that hub 150 can only provide certain types of sensor data within collected sensor data to appliance 110, or that hub 150 is allowed to provide all the collected sensor data to appliance 110.

Figure 1C:
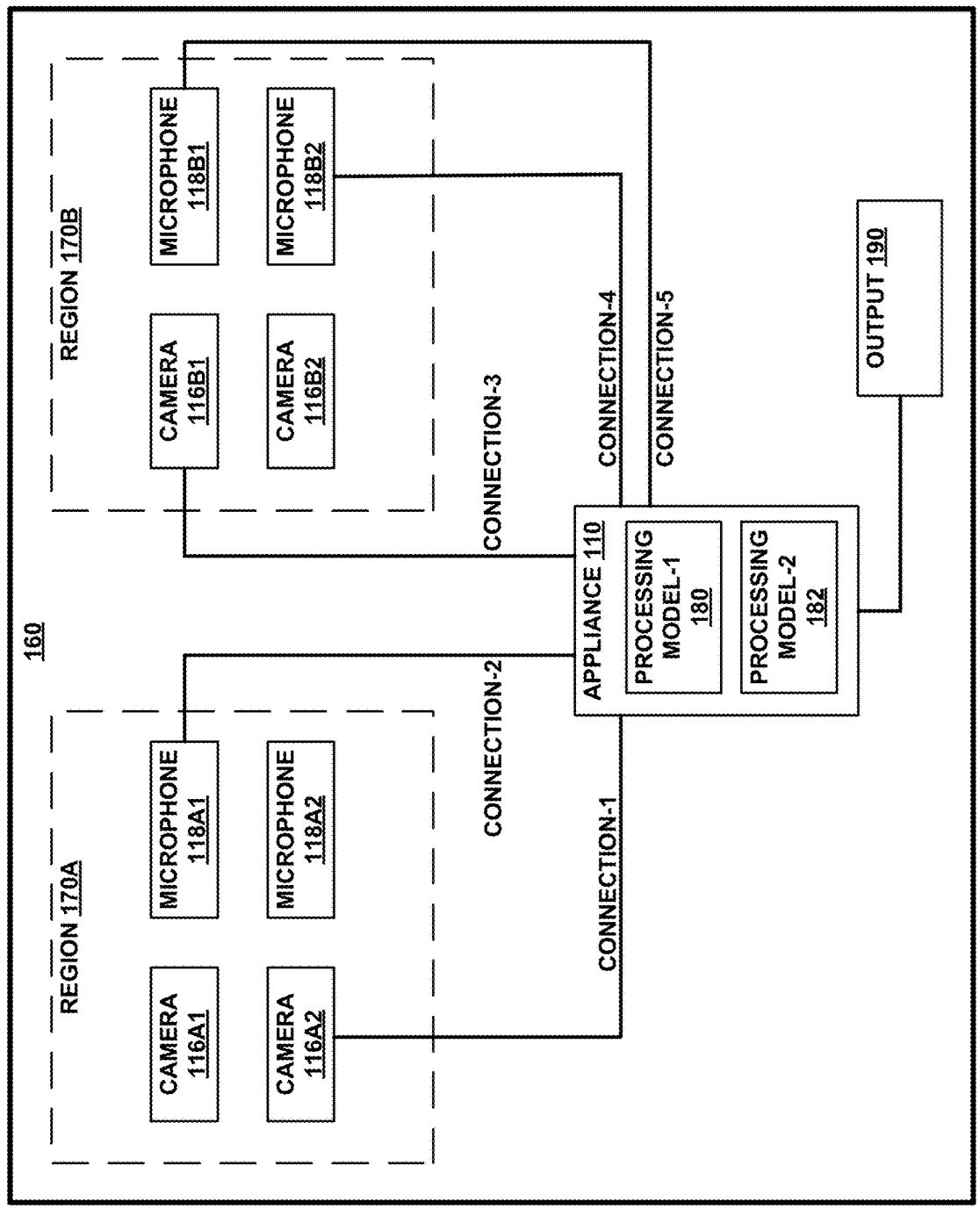
FIG. 1C is an interface of an exemplary system environment consistent with embodiments of the present disclosure.

FIG. 1C shows an example organizational node arrangement interface 160 consistent with embodiments of the present disclosure. An operator of appliance 110 may view interface 160 on any sort of computer device, such as a smart phone, tablet, laptop, or desktop computer. Interface 160 may include selectable elements that may be selected by an input device (e.g., a mouse, keyboard, etc.). Selectable elements may include icons representative of cameras 116A1 and 116A2, and microphones 118A1 and 118A2. Selectable elements may also include icons representative of cameras 116B1 and 116B2, and microphones 118B1 and 118B2. Moreover, appliance 110, as well as connection 1 to connection 5, processing model-1 and processing model-2, and output 190 may be selectable elements. Interface 160 may be a touchscreen interface that allows for manipulation of each element on the interface via the touchscreen. For example, each selectable element on interface 160 may be draggable, movable, and adjustable in size within interface 160 via user gestures. User gestures may be, for example, pinching, swiping, and dragging finger gestures along the touchscreen.

An operator of appliance 110 may have numerous sensor devices, such as camera 116 and microphone 118, located in different regions of an environment under surveillance. For example, a user may have cameras 116A1 and 116A2, and microphones 118A1 and 118A2, positioned in a region 170A. The user may also have cameras 116B1 and 116B2, and microphones 118B1 and 118B2, positioned in a region 170б. Regions 170A and 170б may be different regions within an environment, may be the same region within an environment, or may be overlapping regions in an environment. For example, regions 170A and 170B may be different regions within a store, airport, or shopping mall. In one example, region 170A may be a jewelry department of a department store, while region 170б may be a kitchen department of the department store. In another example, region 170A may be a departure area of an airport, while region 170B may be an arrival area of the airport.

Appliance 110 may be connected to one or more of cameras 116A1, 116A2, 116B1, and 116B2, and/or appliance 110 may be connected to one or more of microphones 118A1, 118A2, 118B1, and 118B2. Connections may be shown on interface 160 via a connection line, such as connection-1. It should be noted that a connection line may be provided on interface 160 when a sensor device is selected to provide sensor data to appliance 110. In FIG. 1C, camera 116A2, microphone 118A1, camera 116B1, microphone 118B1, and microphone 118B2 have been selected to provide sensor data to appliance 110 via connection-1 to connection-5, respectively. However, an operator may deselect one or more of camera 116A2, microphone 118A1, camera 116B1, microphone 118B1, and microphone 118B2, and/or select one or more of cameras 116A1, microphone 118A2, camera 116B2, and 118B1. In such a case, the connections shown on interface 160 will change to represent the selected connections that have been made.

Interface 160 may also allow an operator to power off or power on a sensor device or appliance 110. For example, by selecting and holding the selectable element of camera 116A1 (e.g., via clicking or pressing on a touchpad showing interface 160), or by performing a predetermined gesture on a tablet of a touchpad running interface 160, an operator may power off or power on camera 116A1.

Interface 160 may allow an operator to select one or more sensor devices to provide data to appliance 110, and may allow for flexibility in the kind of data that is processed and analyzed by appliance 110. For example, region 170A may be a jewelry department of a department store that is very crowded and busy, while region 170B may be the kitchen department of the department store that is not busy. An operator of appliance 110 may determine that more data from region 170A should be analyzed by appliance 110 due to the increased number of people in region 170A. Thus, the operator may select all of cameras 116A1 and 116A2 and microphones 118A1 and 118A2 to provide data to appliance 110 for processing and analysis. Moreover, the operator may de-select cameras 116B1 and 116 B2, and microphones 118B1 and 118B2, so that data from region 170B is not provided to appliance 110.

The selection/de-selection of sensor devices may be automated. For example, appliance 110 may determine that region 170A is busy based on an increased number of detected of faces, voices, groupings, and/or bodies in collected data. Accordingly, appliance 110 may automatically determine and command that more sensor devices in region 170A (e.g. one or more cameras 116 and/or microphones) are selected to provide data to appliance 110. Sensor devices themselves may detect an increased number of detected of faces, voices, groupings, and/or bodies in sensor data of a region (e.g. region 170A or 170B), and may request that appliance 110 select more sensor devices in the region to provide more data to appliance 110.

The operator may also select a processing model to process data collected by selected cameras and microphones. For example, processing model-1 180 and processing model-2 182 may be provided by appliance 110 to process collected data according to different processing models. Differences between the processing models may include how certain characteristics of data are weighted, and/or how certain types of data are processed. More or less processing models than those shown in FIG. 1C may be present and selectable by an operator. The output of appliance 110 is fed to output 190. Output 190 may be data in various data formats. For example, output 190 may be in XML.

Figure 2:
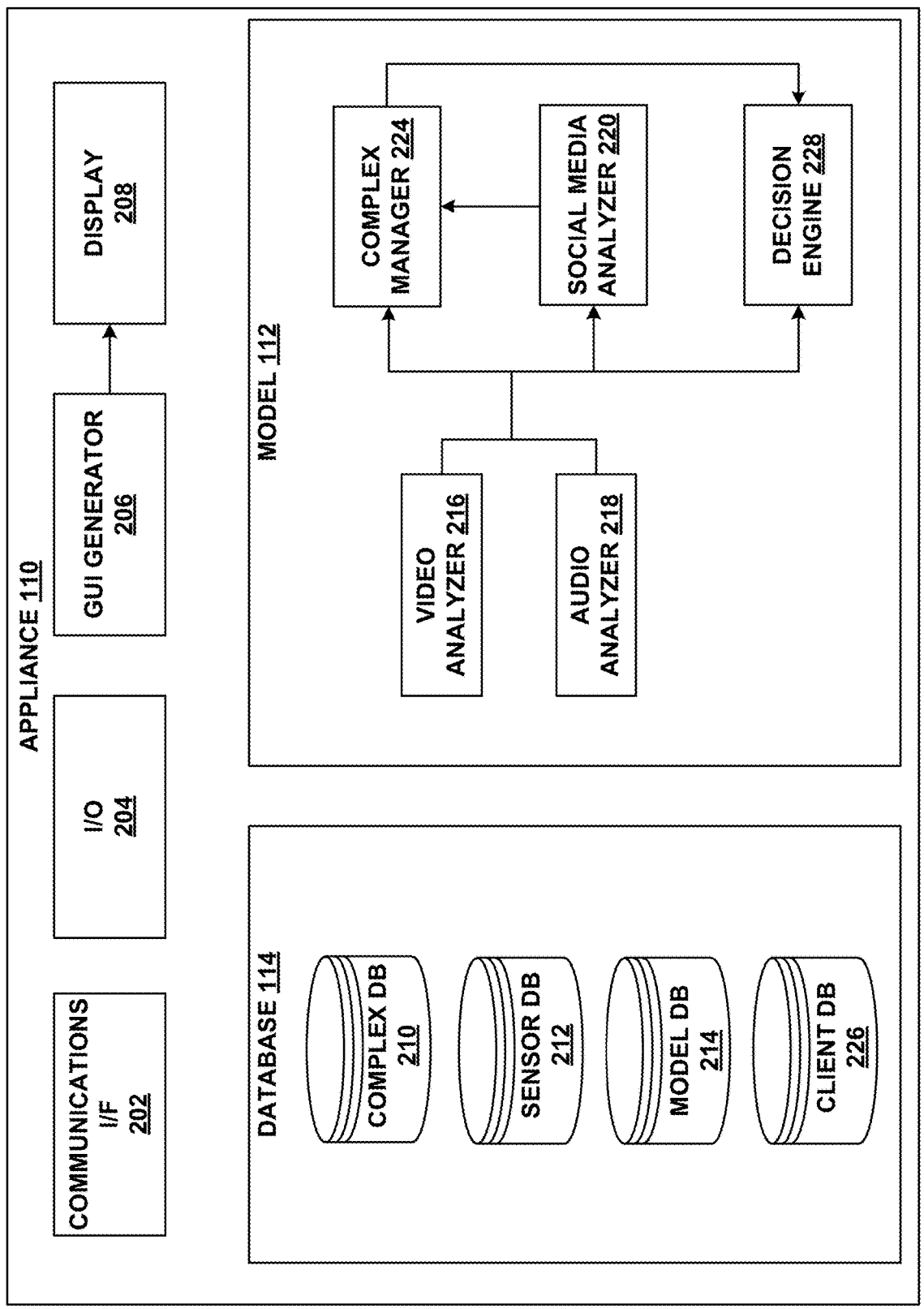
FIG. 2 is a block diagram of an exemplary appliance, consistent with embodiments of the present disclosure.

FIG. 2 is a block diagram of an exemplary appliance 110 for implementing embodiments and aspects of the present disclosure. Appliance 110 may include one or more models 112 that may be configured to manage complex profiles, analyze collected data, and provide personalized and tailored user experiences to one or more users. The arrangement and number of components included in appliance 110 is provided for purposes of illustration. Additional arrangements, number of components, and other modifications may be made, consistent with the present disclosure.

As shown in FIG. 2, appliance 110 may include one or more communications interfaces 202. Communications interface 202 may allow electronic data to be transferred between appliance 110, one or more clouds 120, sensors such as cameras 116 and microphones 118, and/or other components. Examples of communications interface 202 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface 202 may receive data in the form of signals, which may be electronic, electromagnetic, optical, or other signals capable of being received by communications interface 202. These signals may be provided to communications interface 202 via a communications path (not shown), which may be implemented using wireless, wire, cable, fiber optics, radio frequency ("RF") link, and/or other communications channels.

Appliance 110 may include one or more input/output (I/O) devices 204 (e.g., physical keyboards, virtual touchscreen keyboards, mice, joysticks, styluses, etc.) that are configured to receive instructions in the form of input from a target person or a client user. The received instructions may include instructions to, for example, manually modify (i.e., add, change, or delete) information in a complex profile, display collected video data or view real-time video data feeds, play back recorded audio data or real-time audio data, provide communications to other components such as cloud 120, etc. I/O 204 may provide the received user instructions to the components of appliance 110, such as complex manager 224, and the components may execute the instructions.

Appliance 110 may also include a graphical user interface (GUI) generator 206 that generates an interactive GUI for display on a display 208. GUI generator 206 may generate an admin GUI for the user to track performance of decision engine 228, manage and manually update complex profiles, view data collected by the one or more sensors (e.g., cameras 116, microphones 118, etc.), and other administrative functions.

Model 112 and GUI generator 206 may be implemented as hardware modules configured to execute the functions described herein. Alternatively, one or more processors suitable for the execution of instructions may be configured to execute the functions of model 112 and GUI generator 206. For example, suitable processors include both general and special purpose microprocessors, programmable logic devices, field programmable gate arrays, specialized circuits, and any one or more processors of any kind of digital computer that may be communicatively coupled to a physical memory (not shown) storing model 112 and GUI generator 206 in the form of instructions executable by the processor. Suitable memories may include, for example, NOR or NAND flash memory devices, Read Only Memory (ROM) devices, Random Access Memory (RAM) devices, storage mediums such as, for example, hard drives, solid state drives, tape drives, RAID arrays, etc. As another example, the functions of model 112 and GUI generator 206 may be included in the processor itself such that the processor is configured to implement these functions.

Display 208 may be implemented using devices or technology, such as a cathode ray tube (CRT) display, a liquid crystal display (LCD), a plasma display, a light emitting diode (LED) display, a touch screen type display, such as capacitive or resistive touchscreens, and/or any other type of display.

Appliance 110 may include database 114, as previously described in relation to FIG. 1. Database 114 may implement one or more complex databases 210, one or more sensor databases 212, one or more model databases 214, and/or one or more client databases 226. For clarity and ease of reference, a database may be referred to as "DB" throughout the disclosure and in the figures.

Complex database 210 may be configured to store complex profile data generated by complex manager 224. Complex profiles may be profiles associated with various people, such as people whose presence is captured in video feed data or audio feed data. For example, a complex profile may be generated for a customer, potential customer, or security risk captured in video feed data or audio feed data by cameras 116 and microphones 118. Complex profiles may include characteristics of a person, such as their preferences and dislikes, habits, relationships, past behavior in various contexts, past shopping tendencies, and other data. Alternatively, complex profiles may be stored within complex manager 224.

Sensor database 212 may be configured to store data collected by cameras 116, microphones 118, and other sensors. For example, video feed data may be captured and stored by sensor database 212, and then passed to video analyzer 216. Audio feed data may be detected and stored by sensor database 212 and passed to audio analyzer 218. Sensor data, such as video feed data from cameras 116 and audio feed data from microphones 118, may be sent to video analyzer 216 and 218 of model 112 in real-time via sensor database 212. Alternatively, or in addition, sensor data, such as video feed data from cameras 116 and audio feed data from microphones 118, may be sent to video analyzer 216 and audio analyzer 218 of model 112 in real-time by a direct connection from sensors, such as cameras 116 and audio feed data from microphones 118, without interaction with sensor database 212.

Model database 214 may be configured to store various models for appliance 110. Model 112 may obtain and load a model from model database 214 depending on various factors, such as the context in which appliance 110 is installed, or the target person whom appliance 110 is monitoring.

Client database 226 may store client data, such as product lists, store inventories, sales data, promotion data, and a variety of other electronic data or any combination thereof. For example, client database 226 may store data regarding the location of a certain product in a store, or the location of a certain product in a shopping mall. In another example, client database 226 may store data regarding certain promotions or offers that relate to a product located in a store.

While complex database 210, sensor database 212, model database 214, and client database 226, as shown in FIG. 2, are each shown to be single databases, one or more of complex database 210, sensor database 212, model database 214, and client database 226 may be implemented as a plurality of databases included in appliance 110 and/or remotely from appliance 110. Moreover, one or more of complex database 210, sensor database 212, model database 214, and client database 226 may be included in the same database.

Video analyzer 216 may receive live or stored video feed data collected from one or more cameras 116, and perform analysis on the video feed data. For example, video analyzer 216 may process the video feed data to detect one or more target person's body or face. Video analyzer 216 may use facial detection techniques to determine points on a target person's face that correspond to various facial features, such as eyes, mouth, nose, chin, forehead, etc. Video analyzer 216 may use distances between such points to determine facial characteristics for faces in the video feed. For example, video analyzer 216 may determine that a first face in a video feed has a first distance between the left eye and right eye, and a second face in the video feed has a second distance between the left eye and right eye. Video analyzer 216 may utilize the first and second distances to differentiate between the first and second faces, and may also use the first and second distances to determine an identity of the first and second faces. Facial detection may determine a gender of a target person in the video feed, as well as an estimated age. Facial detection may be vector based, where identifying feature vectors are needed but no image retention is required. Facial detection may alternatively, or in addition, be image based, where face matching is based on stored images. Video analyzer 216 may use facial and/or body tracking when a face and/or body is recognized in video feed data. Using such tracking, video analyzer 216 may measure walk-in or walk-by ratios, as well as premises occupancy. Video analyzer 216 may also distinguish certain people in video feed data from other people. For example, video analyzer 216 may distinguish customers in video feed data from sales staff.

Video analyzer 216 may use object detection techniques to determine that one or more objects are located in video feed data. For example, video analyzer 216 may determine that a certain product is located in video feed data by recognizing an outline, barcode, or product title on a box of the product. Video analyzer 216 may additionally, or alternatively, determine an object in video feed data due to a unique shape of the object or unique features of the object, or by matching features of the object to previously stored images of the object. Video analyzer 216 may use object detection techniques, such as video image segmentation and video image edge detection. Video analyzer 216 may use object tracking when an object is recognized in video feed data.

Video analyzer 216 may determine groupings in a video feed. For example, video analyzer 216 may detect a target person in a video feed and determine at least one other person within the video feed. For example, video analyzer 216 may determine two or more people in video feed data are together and should be grouped, or whether they are strangers who should not be grouped. Video analyzer 216 may also determine whether a person is alone and not part of any group. For example, video feed data may include data showing a mother and daughter, where the mother is interacting with her daughter by carrying the daughter or holding the daughter's hand. The mother and daughter may be grouped together by video analyzer 216 based on this interaction. A grouping may also be determined by video analyzer 216 when two or more people stay in close proximity to each other for a predetermined period of time within a video feed data. For example, a grouping may be determined by video analyzer 216 when a group of friends are walking together in a shopping mall. Video analyzer 216 may determine when a grouping breaks apart—for example when members of the group of friends part ways to enter different stores. However, video analyzer 216 may detect when a previously detected group reforms.

Video analyzer 216 may also determine whether a person is exhibiting characteristic movements within a video feed. For example, video analyzer 216 may determine that a target person is pacing between different locations in an environment, walking at a leisurely pace, or running through an environment. In another example, video analyzer 216 may determine whether a target person is holding a product, has placed a product in their cart or bag, or is concealing a product they have picked up.

Video analyzer 216 may also determine that a target person's detected face is looking in a certain direction or looking at a certain product. For example, video analyzer 216 may determine that a target person has been looking at a product in a display case, is holding a product in their hands, or that the target person has brought their face closer to a product to inspect it. Furthermore, video analyzer 216 may determine that a target person is looking at another person, and how long the target person has been looking at the other person. Video analyzer 216 may also determine whether a target person is talking to another person by analyzing one or more of the direction of the target person's face, whether the other (or some other) person is located in the gaze direction of the target person's face, and the target person's mouth and eye movement. For example, video analyzer 216 may determine a gaze direction from extracted facial data by analyzing one or more of the eye movement, facial movement, and head movement of a target person. Video analyzer 216 may detect a movement of the target person from the extracted facial data, or from detected and extracted body data of the target person.

Video analyzer 216 may determine an amount of time that a target person has been looking at a product or holding a product. For example, video analyzer 216 may generate a first time stamp when a target person picks up an object, and generate a second time stamp when the target person puts the object down. Video analyzer 216 may determine the amount of time a target person has been in a certain location. For example, video analyzer 216 may determine how long a target person has been standing in a location of an environment, walking in an environment, and whether a target person is pacing between certain locations in an environment.

Video analyzer 216 may determine whether the target person's detected face and/or body language exhibits one or more moods. For example, video analyzer 216 may determine that a target person's detected face is, smiling, frowning, looking sad or concerned, etc. Video analyzer may use detection of one or more features of a target person's face to make this determination, such as mouth, frown, eyebrow, or eye movement. Based on this determination, video analyzer 216 may determine a mood of a target person.

Video analyzer 216 may also determine whether a target person's body language exhibits one or more moods. For example, video analyzer 216 may determine that a target person's arms are crossed when they are looking at a certain product, which may exhibit concern or skepticism regarding the product. In another example, video analyzer 216 may determine whether a user is moving their hands in certain ways that indicates an animated conversation, or a question about a certain product. Video analyzer may also determine whether a target person is giving a certain sign with their hands, such as a "thumbs up" sign, or any other hand sign (including sign language hand signs).

Video analyzer 216 may recognize objects, products, signs, faces, bodies, and the like in video feed data by pointing to standardized structures. For example, when a watch is detected in video feed data, video analyzer 216 may point to a stored, standardized watch token definition to reference the detected watch, and/or when a certain sign is detected in video feed data, video analyzer 216 may point to a stored, standardized sign token definition to reference the detected sign.

Video analyzer 216 may also detect and count a number of people in a video feed. Counting may include counting during only predetermined time periods, or continuously counting during the entire time of function. Video analyzer 216 may provide count data for a video feed to decision engine 228, where decision engine 228 may predict a number of people who will be present in the video feed or present in an environment represented by the captured video feed.

Audio analyzer 218 may receive live or stored audio feed data from microphone 118. Audio analyzer 218 may determine characteristics in an audio feed data, such as whether voice data is included in the audio feed data. For example, audio analyzer 218 may determine intonation, speed, inflection, slurring, and other characteristics of a voice in the audio feed data. Audio analyzer 218 may also determine whether a voice in the audio feed data has a certain accent, and thereby may determine whether the target person is from a certain region of a country, or region of the world. Audio data may be converted to JSON and/or XML tokens.

Social media analyzer 220 may identify social media profiles associated with a target person present in video feed data and/or audio feed data. For example, social media analyzer 220 may crawl the internet to determine social media profiles of the target person. Social media analyzer 220 may scour determined social media profiles of the target person to determine personal information (such as a target person's name, address, date of birth, alma mater, workplace, etc.), relationship information (such as the target person's friends and family, relationship status, anniversary, etc.), likes and preferences of the target person, and other information related to the target person's life.

Social media analyzer 220 may also scour posts and comments on the target person's social media profile, made by the target person and by other social media users, to determine information about the target person. Social media analyzer 220 may also scour posts and comments on other user's social media profiles, made by the target person, or that have tagged the target person, to determine information about the target person. Social media analyzer 220 may also determine whether a target person follows or tracks certain products, stores, people, companies, celebrities, etc. via their social media profile, whether a target person has indicated approval for certain posts or comments via their social media profile, and whether the target person has forwarded certain posts or information contained on social media.

Complex manager 224 may generate and manage complex profiles. Complex profiles may be profiles associated with various people, such as people whose presence is captured in video feed data or audio feed data. For example, a complex profile may be generated for a target person, e.g., a customer, potential customer, or security risk, captured in video feed data and/or audio feed data by cameras 116 and microphones 118. Complex profiles may include characteristics of a target person, such as their preferences and dislikes, habits, relationships, past behavior in various contexts, past shopping tendencies, and other data. Complex manager 224 may receive and utilize data collected by social media analyzer 220 to generate or update a complex profile.

Alternatively or in addition, data from video analyzer 216 and/or data from audio analyzer 218 may also be received and used by complex manager 224. Complex manager 224 may also use data entered via I/O devices 204. For example, a store attendant or a target person, including, e.g., a customer, potential customer, or security risk, may use one or more I/O devices 204 (e.g., physical keyboards, virtual touch-screen keyboards, mice, joysticks, styluses, etc.) to input information into complex manager 224 for generation of a new complex profile, or updating/editing of an existing complex profile. When a target with a stored complex profile is detected in video feed data or audio feed data, a complex profile corresponding to the target person may be fetched by complex manager 224 from complex database 210 and may be updated by complex manager 224, based on data received from video analyzer 216 and audio analyzer 218. Complex manager 224 may send a complex profile for a target person to decision engine 228 for a determination on user experience personalization.

Complex manager 224 may determine that a complex profile includes information that enables complex profile sharing for family members and friends of a target person. For example, a target person may have activated family sharing of complex profiles. Thus, the target person's complex profile may include information about family members, such as family member interests and preferences gathered from complex profiles of family members, and decision engine 228 may utilize such information to give the target person recommendations.

Decision engine 228 may make user experience personalization decisions based on analysis of the video feed data, audio feed data, social media, complex profiles, and other information. For example, decision engine 228 may make decisions such as whether to offer a target person a discount, whether to provide more information to the target person, or whether to target advertisements to the target person. For example, decision engine 228 may receive video feed data from video analyzer 216 that indicates a target person is exhibiting a certain mood, as determined from facial expressions and/or body language of the target person in the video feed, and that indicates that a user is looking at a particular product. Decision engine 228 may receive data from audio analyzer 218 that indicates a target person is exhibiting a certain mood, as determined from inflections in the target person's voice, and/or speed at which the user is speaking. Decision engine 228 may receive data from social media analyzer 220 and complex manager 224, which indicates personal information as to the target person such as an interest in the product, or prior research conducted by the target person regarding the product. Based on these items, decision engine 228 may, for example, determine that a target person should be given a discount to entice the target person to complete a purchase of a product, that a target person should be shown advertisements regarding the product, and/or that a store clerk should be directed to the target person to assist the target person in studying the product or purchasing the product. Decision engine 228 may also make such recommendations based on a detected location of a target person. For example, decision engine 228 may detect that a user entered a shopping mall on the east side entrance, and may recommend advertisements and discounts to retailors located in this area of the shopping mall, or within a predetermined distance of a location of the target person.

Decision engine 228 may further make suggestions based on a predetermined distance within locations of a retailer, a target person's vehicle, or any other landmark.

Decision engine 228 may further recommend an agenda for a particular day. For example, based on a complex profile of a target person and/or sensor data, decision engine 228 may recommend a list of activities and/or locations that a target person visit, and order in which each should be completed. For example, decision engine 228 may determine that a parent and her child are located in a shopping mall. Decision engine 228 may recommend that the parent and child visit an in-mall playground, and thereafter visit the parent's favorite shoe store. Such a determination may be based on a determined mood of the parent and/or the child, as well as the parent and/or child's information contained in their complex profile. Decision engine 228 may transmit map information regarding recommended playground and shoe store to a user device of the parent, such as directions to the playground and store.

Decision engine 228 may also make recommendations and suggestions for a target person based on a determined context. For example, recommendations may be adjusted based on whether the target person is alone or with relatives, friends, co-workers, or children. Moreover, recommendations and suggestions may be based on the time of day, or hours of operation for stores.

Decision engine 228 may receive data from model database 214 that indicates a model defining a context in which the received information should be analyzed. For example, a model from model database 214 may be a retail model, which causes data in the system to be analyzed by decision engine 228 in the context of promoting the sale of products and satisfaction of customers. In another example, a model from model database 214 may be a hospital model, which may cause data in the system to be analyzed by decision engine 228 in the context of determining how much pain a target person is in, or whether the target person needs immediate medical assistance. Model database 214 may store models representative of multiple contexts in addition to those discussed above, such as, banks, airports, expo and entertainment venues, sporting events, etc.

In certain cases, regulatory laws or constraints on data use may be present in jurisdictions where appliance 110 and/or cloud 120 is deployed. Thus, the data processing performed by appliance 110 and/or cloud 120 may be performed on an anonymous basis. For example, video analyzer 216 may receive MPEG video data from one or more cameras 116. Video analyzer 216 may utilize facial detection techniques to determine various points on a person's face within the MPEG video data, and may determine distances between facial features (e.g., distance between eyes, distance between nose and mouth, distance between ears, distance between forehead to chin, distance between cheeks, mouth width, etc.). Video analyzer 216 may further determine skin tone, number of freckles, wrinkles, facial feature shape, and the like. These data (e.g., data point and distance data) may be extracted from the MPEG video data in a secured format and remaining data of the MPEG video data may be discarded. Video analyzer 216 may output the extracted data to complex manager 224, social media analyzer 220, and decision engine 228 in the secured format. Thus, the extracted data may be generic and lossy, and anonymous in the sense that the extracted data provides only certain data points and distance data to complex manager 224, social media analyzer 220, and decision engine 228, rather than full MPEG video data files showing full facial and/or body detail. This data extraction also may provide increased processing speed, and may aid in the ability of appliance 110 to handle vast different sources of data for processing, because rather than decision engine 228 processing an entire MPEG file (or MPEG feed), decision engine 228 may only process extracted data point(s) and distance data.

FIG. 3 is a block diagram of an exemplary cloud 120 for implementing embodiments and aspects of the present disclosure. The arrangement and number of components included in cloud 120 is provided for purposes of illustration. Additional arrangements, number of components, and other modifications may be made, consistent with the present disclosure.

As previously discussed, in some embodiments, data collected by the sensors (e.g., cameras 116 and microphone 118) may be too voluminous to store locally at appliance 110. Instead, appliance 110 may transmit portions of the collected data to cloud 120 for storage in database 124. Moreover, all or some of the engagement tracking operations and output analysis may be too computationally intense to be performed at appliance 110. Instead, appliance 110 may notify cloud 120 that cloud 120 should receive some or all of the sensor data regarding the environment, and perform some or all of the analysis of the sensor data. Data analyzer 122 may then perform the tracking and analysis, and may provide the output to appliance 110 for forwarding on to a target person's user device 140. Accordingly, processing capability of system environment 100 may be increased without increasing the installation footprint at the client location.

Data analyzer 122 may include one or more of the same capabilities as described for model 112 in appliance 110. For example, data analyzer 122 may include video analyzer 316, audio analyzer 318, complex manager 324, social media analyzer 320, and decision engine 328, and perform the same or similar functions as video analyzer 216, audio analyzer 218, complex manager 224, social media analyzer 220, and decision engine 228 described in regards to FIG. 2. However, data analyzer 122 may process larger and more voluminous amounts of sensor data from cameras 116 and microphones 118, collected an appliance 110, that appliance 110 may not be able to process efficiently or in quick enough time. Thus, data analyzer 122 may include a higher computer and processing power than that included in an appliance 110. For example, data analyzer 122 may include processing capabilities that allow for efficient processing of ultra-high definition video and audio feed data in real time. Analyzing such ultra-high definition sensor data may increase the accuracy of mood determinations, for example. Data analyzer 122 may include a predetermined data model for analyzing collected data. An additional data model may also be uploaded to and/or included in data analyzer 122. The additional data model may analyze collected data alone or in combination with the predetermined data model. Moreover, the additional data model may analyze the collected data at the same time as when the predetermined data model analyze the collected data. Comparisons between the results of each data model may therefore be generated. There may be one or more predetermined data models, and one or more additional data models, included in data analyzer 122, and each of these one or more models may analyze data alone, analyze collected data in combination, and/or analyze collected data at the same time.

Moreover, data analyzer 122 in cloud 120 may consolidate voluminous sensor data from one or more appliances 110 located in different or the same stores, locations, or environments. For example, data analyzer 122 may receive both sensor data from an appliance 110 located in XYZ shoe store in a local shopping mall, and sensor data from another appliance 110 located in XYZ shoe store on main street. Decision engine 328 of data analyzer 122 may utilize sensor data received from both appliances 110, analysis by social media analyzer 320, and analysis by complex manager 324, to determine, for example, what products customers in each store are requesting, which products customers in each store have performed prior research on, and the moods of customers in each store. Based on this analysis, decision engine 228 may decide to offer global discounts, recommendations, or announcements to all or certain customers located in both or one of the XYZ shoe store in the shopping mall and the XYZ shoe store on main street.

Figure 3A:
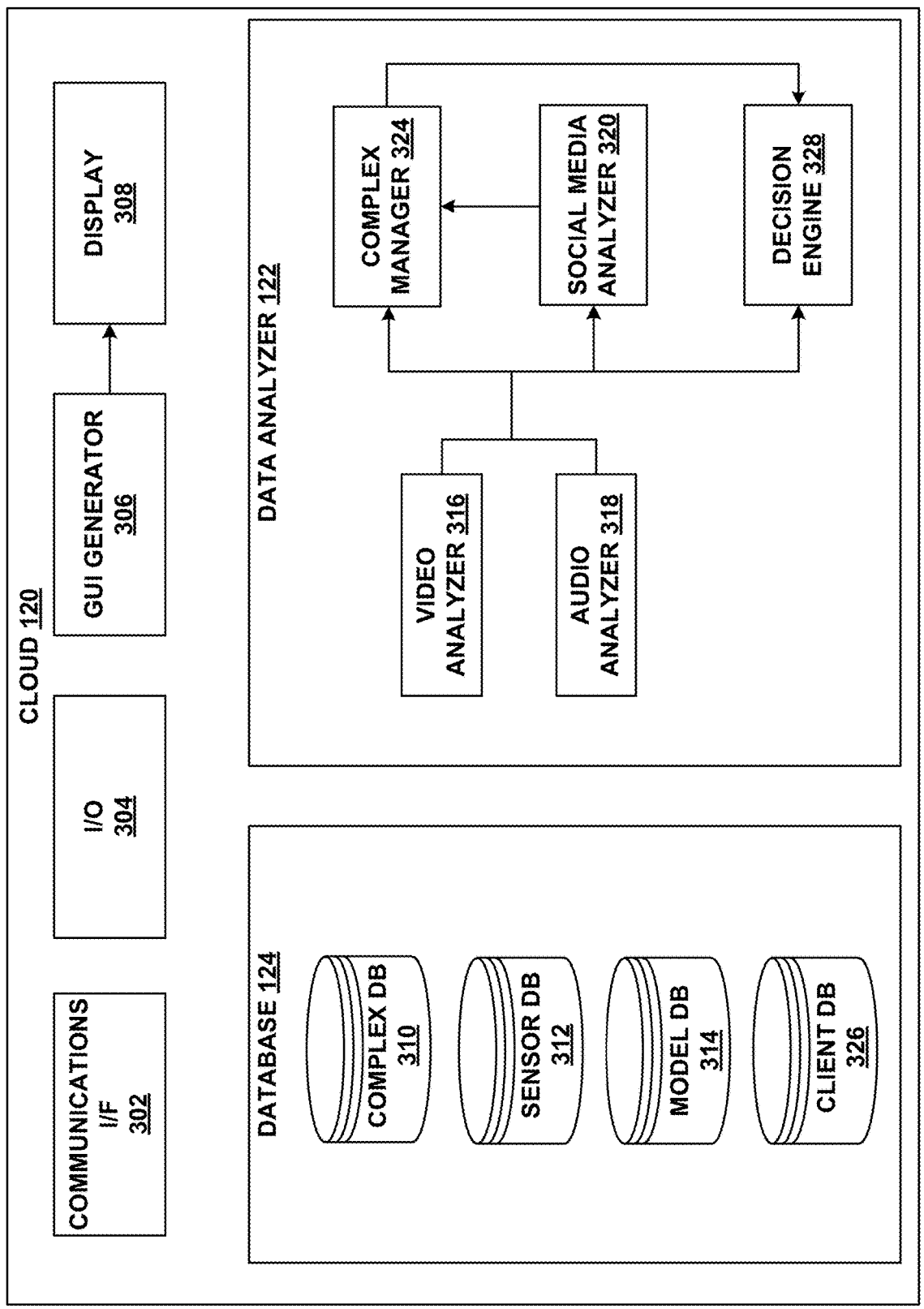
FIG. 3A is a block diagram of an exemplary cloud, consistent with embodiments of the present disclosure.

As shown in FIG. 3A, cloud 120 may include one or more communications interfaces 302, I/O 304, GUI generator 306, and display 308. These components may perform the same or similar functions as communications interfaces 202, I/O 204, GUI generator 206, and display 208 described in regards to FIG. 2.

Data analyzer 122 and GUI generator 306 may be implemented as hardware modules configured to execute the functions described herein. Alternatively, one or more processors suitable for the execution of instructions may be configured to execute the functions of data analyzer 122 and GUI generator 306. For example, suitable processors include both general and special purpose microprocessors, programmable logic devices, field programmable gate arrays, specialized circuits, and any one or more processors of any kind of digital computer that may be communicatively coupled to a physical memory (not shown) storing data analyzer 122 and GUI generator 306 in the form of instructions executable by the processor. Suitable memories may include, for example, NOR or NAND flash memory devices, Read Only Memory (ROM) devices, Random Access Memory (RAM) devices, storage mediums such as, for example, hard drives, solid state drives, tape drives, RAID arrays, etc. As another example, the functions of data analyzer 122 and GUI generator 306 may be included in the processor itself such that the processor is configured to implement these functions.

Cloud 120 may include database 124, as previously described in relation to FIG. 1. Database 124 may implement one or more complex databases 310, one or more sensor databases 312, one or more model databases 314, and one or more client databases 326, and perform the same or similar functions as complex database 210, sensor database 212, model database 214, and client database 226 described in regards to FIG. 2.

Figure 3B:
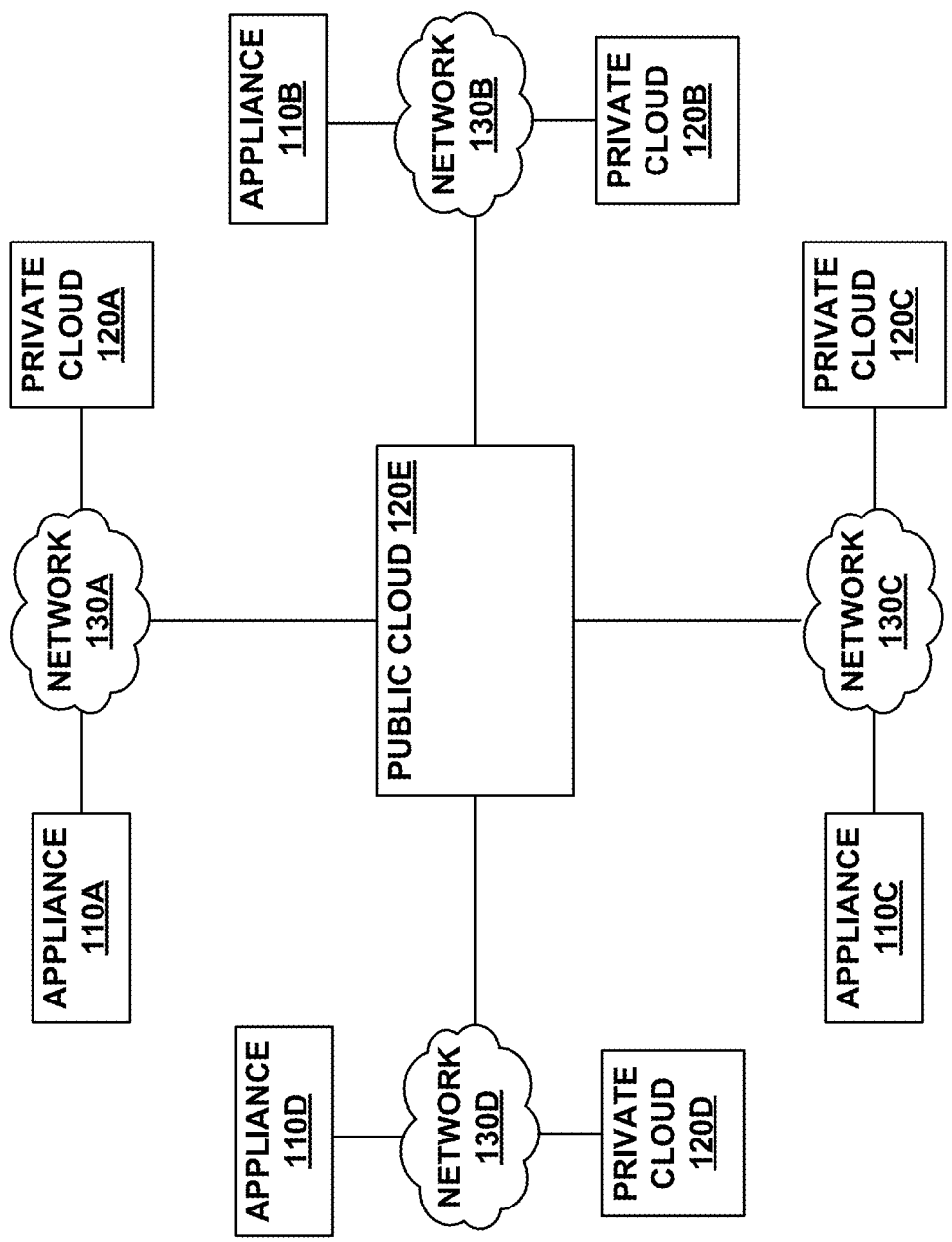
FIG. 3B is a block diagram of an exemplary environment including a public cloud and private clouds, consistent with embodiments of the present disclosure.

Cloud 120 may configured as either a public cloud or a private cloud. Moreover, a plurality of clouds 120 may be connected to one or more appliances 110. FIG. 3B is a block diagram of an exemplary environment including a public cloud and private clouds, consistent with embodiments of the present disclosure. Appliances 110A-D may each be connected to a respective private cloud 120A-D via a respective network 130A-D. Appliances 110A-D may also each be connected to a public cloud 120E.

One or more of private clouds 120A-D may perform analysis on data collected by one or more of appliances (e.g., appliances 110A-D, respectively) as discussed above. Private clouds 120A-D may also collect analysis performed by a respective Appliance 110A-D, and utilize this analysis in the analysis that it performs. Each private cloud 120A-D may not provide the analysis it performs to public cloud 120E. For example, private cloud 120A may analyze sensitive, confidential, or private data collected by appliance 110A, without providing its analysis to public cloud 120E. This is because an operator of appliance 120A may not want the results of analyzing such sensitive, confidential, or private data shared to public cloud 120E and utilized in the analysis performed by public cloud 120E. Accordingly, the analysis performed at private cloud 120A can be kept separate from the analysis performed by public cloud 120E, and public cloud 120E may not utilize analysis performed by private cloud 120A in its analysis.

Alternatively, private cloud 120A may provide all or some of the analysis it performs to public cloud 120E, if authorized. For example, private cloud 120A may be authorized to provide the results of only certain analysis to public cloud 120E. In such a case, private cloud 120A may communicate such analysis to public cloud 120E via network 130A. Public cloud 120E may then leverage the analysis performed by private cloud 120A in its own analysis for Appliance 110A, or for Appliances 110B-D.

Public cloud 120E may perform analysis on data collected by one or more of appliances (e.g., Appliances 110A-D, respectively) as discussed above. Public cloud 120E may also collect analysis performed by a respective appliance 110A-D, and utilize this analysis in the analysis that it performs. Public cloud 120E may also collect analysis performed by one or more over private clouds 120A-D, if authorized, as discussed above. Public cloud 120E may then utilize the analysis performed by private clouds 120A-D in its own analysis.

In one example, appliance 110A may collect confidential data, and provide such data to private cloud 120A via network 130A. Private cloud 120A may analyze such confidential data. Private cloud 120A may be authorized by an operator of Appliance 110A to provide such analysis to public cloud 120E, for public cloud 120E to utilize in its own analysis. Appliance 110б may collect data (confidential or not confidential) that is related to the confidential data collected by appliance 110A. Collected data may be related if any of a multitude of conditions are met, such as if each collected data is video data of a similar environment, audio data with similar vocal and/or sounds, or document data featuring matching symbols, words, or content, for example. Appliance 110б may provide its collected data via network 130б to public cloud 120E for analysis. Public cloud 120E may then analyze the data collected by appliance 110б by utilizing the analysis performed by private cloud 120A on the related confidential data collected by appliance 110A. Accordingly, public cloud 120E can leverage the analysis of confidential data in performing analysis of other confidential or non-confidential data.

Figure 4A:
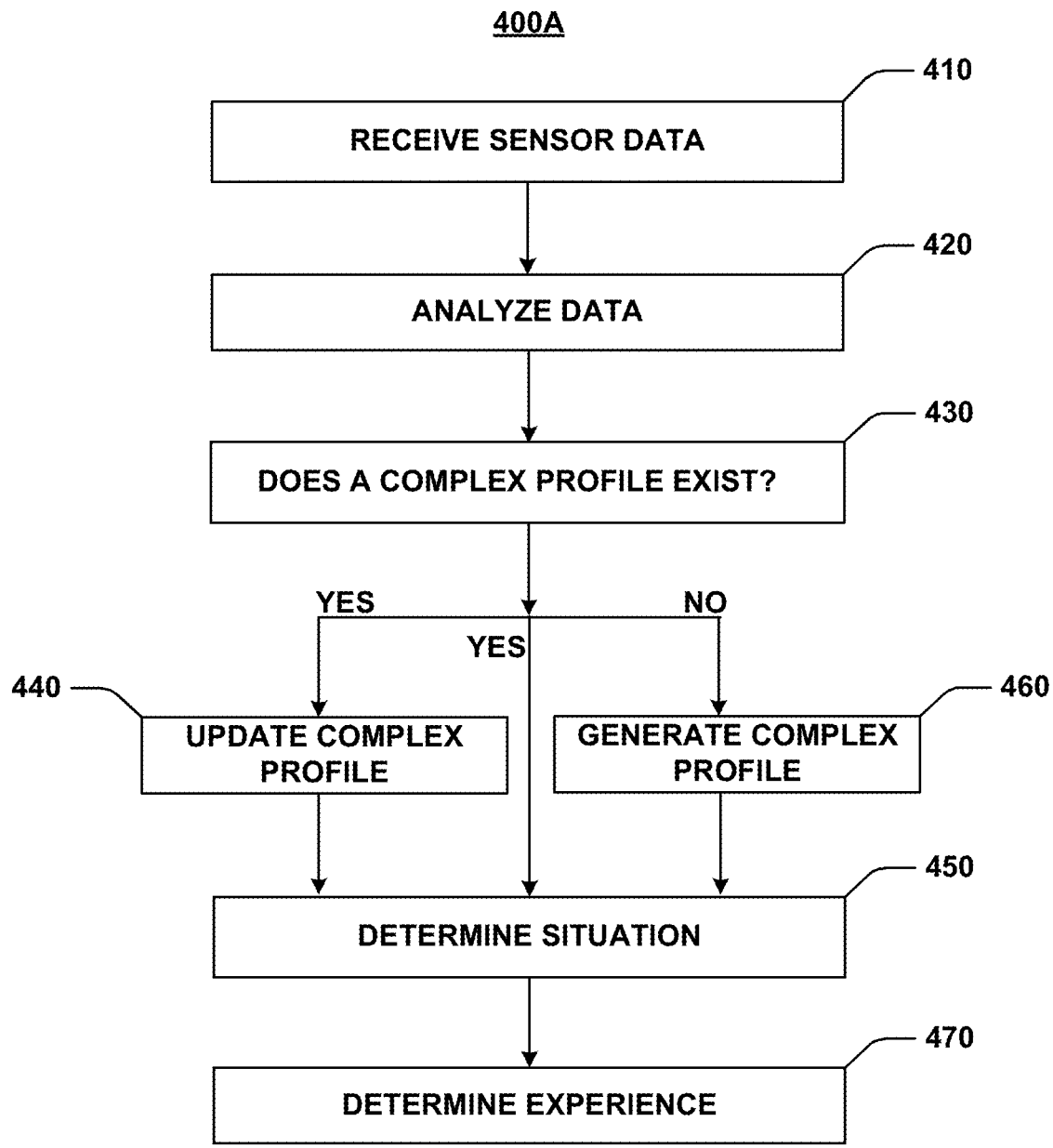
FIG. 4A is a flowchart representing an exemplary method for identity management and user experience decision making consistent with embodiments of the present disclosure.

FIG. 4A is a flowchart representing an exemplary method 400A for sensor data analysis and user experience decision making consistent with embodiments of the present disclosure. The number and sequence of operations in FIG. 4A are provided for purposes of illustration and may be modified, enhanced, substituted, or otherwise changed, in view of the present disclosure. In some embodiments, method 400A may be implemented as one or more computer programs executed by one or more processors. Moreover, in some embodiments, aspects of method 400A may be implemented by an appliance (e.g., appliance 110 having one or more processors executing one or more computer programs stored on a non-transitory computer readable medium). In some embodiments, aspects of method 400 may be implemented by a cloud (e.g., cloud 120 having one or more processors executing one or more computer programs stored on a non-transitory computer readable medium).

In some embodiments, example method 400 may include receiving sensor data at 410. Cameras 116 and microphones 118, for example, may collect video feed data and audio feed data from an environment. Such data may include data relating to a target person, including, but not limited to, a customer, potential customer, or person that may be security risks, and may be fed, for example, to video analyzer 216 and audio analyzer 218 for analysis. At 410, both video feed data and audio feed data may be collected at the same time, or one of video feed data or audio feed data may be collected. Also, video feed data and audio feed data may be collected at different times. For example, in a first time period only audio feed data may be collected, in a second time period only video feed data may be collected, and in a third time period, both audio feed data and video deed data may be collected at the same time.

In some embodiments, example method 400A may include analyzing sensor data at 420. For example, video analyzer 216 may analyze the video feed data to detect and extract the target person's facial data from the video feed data using facial detection techniques. Audio analyzer 218 may analyze the audio feed data to determine characteristics of the target person's voice if it is present in the audio feed data. For example, audio analyzer 218 may determine intonation, speed, inflection, slurring, accent, and other characteristics of a voice in the audio feed data. Audio analyzer 218 may detect and extract the target person's voice or other noise data from the audio feed data.

Analyzing sensor data at 420 may also include detecting indicator data within the video feed data by video analyzer 216, and/or detecting indicator data within the audio feed data by audio analyzer 218, and extracting the detected indicator data. The indicator data may be associated with the environment in which the target person is present. For example, indicator data detected within video feed data may be a sign, product, item, object, or the like. Indicator data detected within audio feed data may be a specific person's (not the target person) voice, accent, phrase, pitch, voice speed, and the like.

Figure 4B:
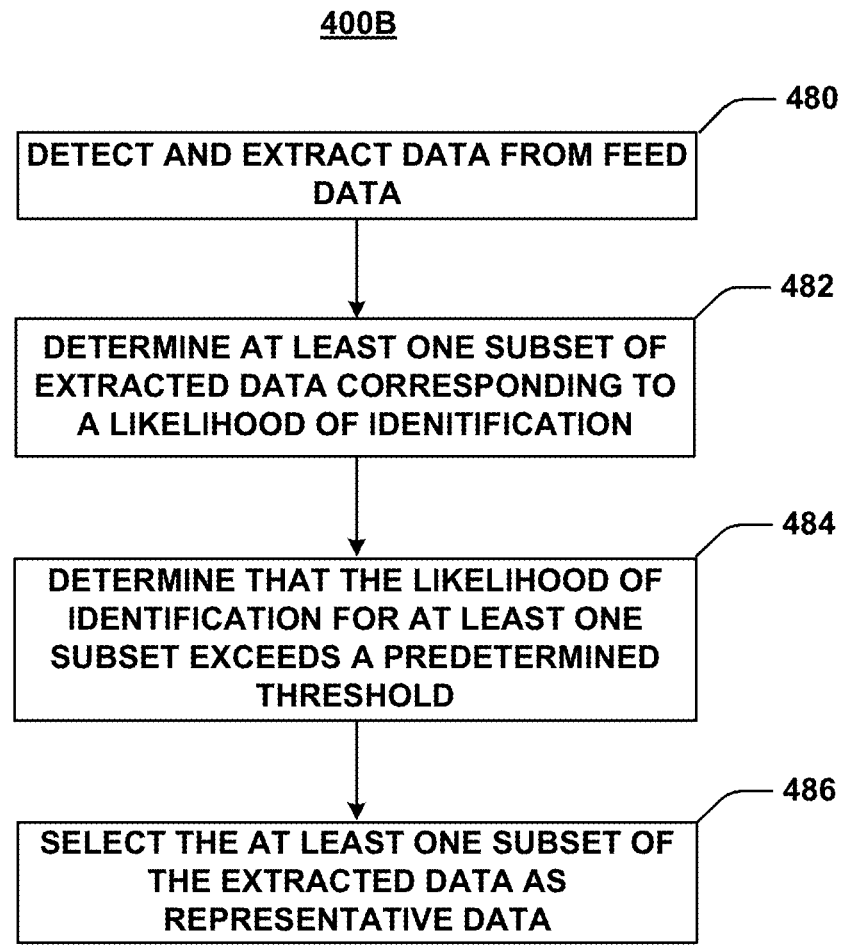
FIG. 4B is a flowchart representing an exemplary method for analyzing sensor data consistent with embodiments of the present disclosure.

The analyzing of sensor data at step 420 is shown in further detail by FIG. 4B. As shown in FIG. 4B, at 480, detected data may be extracted from collected sensor data. For example, facial data is extracted from video feed data and/or audio data is extracted from audio feed data. The extracted facial data and/or audio data may be transformed into representative data. The representative data may be a compressed format of the extracted data that includes only a subset of the extracted data. The compressed format may include less data than the collected data and the extracted data, and may be lossy. The transforming of extracted data into representative data is described in steps 482-486.

At 482, at least one subset of the extracted data may be determined that corresponds to a likelihood of identifying the target person. For example, at least one subset of the extracted facial data that corresponds to a likelihood of identifying the person may be determined. The subset of the extracted facial data may be data representing the separation distance between facial features, eye color, the color of a facial feature, the shape of a facial feature, and/or data reflecting skin tone, among others. For example, the subset of facial data may be data representing the distance between a left and right eye, the distance between a left ear and a right ear, the distance between a mouth and a nose, etc. Each subset of the extracted data may be associated with a respective likelihood of identification. A higher likelihood may correspond to an increased chance of identifying the target person correctly. For example, the subset of data that represents separation between the left and right eyes may be associated with a first likelihood of identification, and the subset of data that represents a shape of a facial feature may be associated with a second likelihood of identification.

At 484, a likelihood of identifying the person for a subset of the extracted facial data may be compared to a predetermined threshold, and it may be determined that the likelihood exceeds the predetermined threshold. If more than one subset is utilized, a combination the likelihoods associated with the subsets may be compared to a predetermined threshold. The predetermined threshold may be generated based on the kind of subset(s) corresponding to a likelihood. For example, the predetermined threshold may be set higher when the subset of extracted facial data is skin tone data, but the predetermined threshold may be set lower when the subset of extracted facial data is data representing a distance between facial features. This threshold setting may occur because the distance between facial features may be more accurate at identifying the target person compared to skin tone.

At 486, the subset(s) of the extracted data is selected as representative data. For example, when the subset of data represents a distance between facial features, and the associated likelihood of identification for this subset is above a predetermined threshold, the subset is selected as representative data. More than one subset may be selected as representative data. For example, if a combination of subsets of data exceed a predetermined threshold, then the combination of subsets are selected as representative data. Alternatively, for example, if a first subset of data exceeds a first threshold, and a second subset of data exceeds a second threshold, then both the first and second subsets of data may be selected as representative data. It should be noted that multiple subsets of data may be selected as representative data in this regard.

Back to example method 400A, in some embodiments, example method 400A may include determining if a complex profile exists for (e.g., is associated with) a target person at 430. Here, representative data (such as representative facial data or representative audio data) may be compared to images and/or videos that correspond to stored complex profiles. A determination may be made as to whether there is a match between the representative data and a complex profile, and whether the target person has an existing complex profile. For example, one or more complex profiles may be stored, but only the complex profile where a determined match between the representative data and the complex profile is above a predetermined threshold may be selected. Complex profiles may be stored in one or more of complex DB 210, complex DB 310, complex manager 224, complex manager 324.

A complex profile may include at least one subset of data representing information about the target person. The at least one subset of data may be gathered from a single database, or a plurality of databases. For example, the at least one subset of data may include data from a social media account of the target person. The complex profile may be updated in real-time as data that the complex profile includes is updated. For example, a complex profile of a target person may include a subset of data corresponding to a first social media account of the target person. When the social media account is used (for example, when the target person likes a certain product, or posts a picture or video to the social media account), in real-time, the subset of data corresponding to the first social media account in the complex profile may be updated. For example, when the target person likes a certain product on one of their social media accounts, the complex profile may be updated in real time so that the subset of data corresponding to that social media account indicates that they have liked the certain product.

In some embodiments, example method 400A may include updating a complex profile at 440. If a complex profile exists for a target person, the process may continue to step 440. Here, the target person's complex profile is updated with information contained in the received sensor data. For example, if the received sensor data shows that the target person picked up and studied a particular product in a store for 15 minutes, the complex profile may have interest information of the user updated to indicate that the user is interested in the product and spent a 15 minutes studying the product in the store. Location information of the complex profile may also be updated with the store being the last known location of the target person. The complex profile may be updated by recording indicator data to the complex profile, and may also be updated by recording determined mood of the target person to the complex profile. The determined mood of the target person is discussed below.

After the complex profile is updated, the process may proceed to step 450. In some embodiments, example method 400A may bypass step 440 and proceed directly to step 450 without updating a complex profile. In some embodiments, example method 400A may include updating a complex profile in step 440 as well as proceeding concurrently to step 450.

In some embodiments, example method 400A may include generating a complex profile at 460. If a complex profile does not exist for a target person or is not associated with the target person, the process may continue to step 460 for complex profile generation. For example, it may be determined that representative facial data is not associated with a complex profile, and that a complex profile therefore should be generated. Complex profile generation will be described in relation to FIG. 5. After complex profile generation occurs at 460, the process may proceed to step 450.

In some embodiments, example method 400A may include a situation determination step at 450. Here, decision engine 228 may receive complex profile information and sensor data, as well as model data from model DB 214. Decision engine 228 may determine, from the data in the complex profile, whether the target person is a frequent visitor to the environment where the cameras 116 of appliance 110 is located. For example, decision engine 228 may determine whether the target person is a repeat customer or a frequent shopper of a store where cameras 116 of appliance 110 are located.

At 450, decision engine 228 may determine a context for the current situation described by the sensor data. For example, the decision engine 228 may determine whether a target person is looking at a product, negotiating over a price, or arguing with another person. Decision engine 228 may determine whether the target person is with somebody else, such as a family member, friend, or co-worker. For example, decision engine 228 may examine whether the target person is part of a group or alone. Decision engine 228 may also determine whether a person is acting suspiciously. For example, decision engine 228 may determine whether a person is pacing between landmarks in an environment, whether a person has been looking at a product for an extended period of time without talking to another person, or any other type of suspicious activity. To determine context for the target person, decision engine 228 may weight and process one or more of a determined mood of the person, at least one subset of data from a complex profile representing data about the person, and indicator data extracted from the video data. Each of the determined mood, at least one subset of data, and indicator data may be weighted the same or differently. For example, the at least one subset of data may indicate that a target person has liked multiple products of a certain brand on a social media account, and indicator data may indicate that the target person is currently in a section of a retail store that sells this brand. The determined mood (which is described below) may indicate that the target person is excited. Thus, each of the determined mood, at least one subset of data, and indicator data may be weighted at the same or similarly high levels in regard to whether the target person is going to purchase a product of the brand, because each factor may indicate that the target person is willing to buy a product of the brand. Processing to determine the context will take into account these weightings and provide that the user is willing to buy the product of the brand. In another example, the at least one subset of data may indicate that a target person has not liked any products of a certain brand, and indicator data may indicate that the target person is currently in a section of a retail store that sells this brand. The determined mood may indicate that the target person is concerned about the price products of the brand. Thus, the determined mood and at least one subset of data may be weighted lower regarding whether the target person is going to purchase a product of the brand because the user does not appear to indicate interest in purchasing a product of the brand. However, the indicator data may be weighted higher than the determined mood and at least one subset of data because the target person is currently in a section of a retail store that sells this brand. Accordingly, processing to determine the context will take into account these weightings and provide that the user may not be willing to buy the product of the brand. The context may also be determined by processing other types of data, such as a gaze direction of the target person (or of other persons in the video feed data), and/or a determined movement of the target person.

Decision engine 228 may also determine a mood of a target person in sensor data. For example, decision engine 228 may determine whether a person is calm, nervous, happy, sad, or concerned, for example. A mood of the target person may be determined by associating learned mood indicators, derived from other data, to representative data or to extracted data. The other data may be detected facial/body data of other people who are in the environment of the target person and/or in different environments. For example, mood indicators may be learned by appliance 110 and/or cloud 120 by analyzing detected facial and/or body data from multiple people in video feeds from the same environment as the target person and/or in different environments. The learned mood indicators may include data representing certain facial movements, expressions, eye movement, and body language. The accuracy of the learned mood indicators may improve as more facial/body data from other people in the environment or in different environments is analyzed. The learned mood indicators may be adjusted and updated dynamically (e.g., in real time as the amount of facial/body data of other people that is analyzed changes, and/or as learned mood indicators are being associated to representative data or extracted data).

In some embodiments, example method 400A may determine an experience at 470. The determined experience may be based on the determined situation of step 450. For example, decision engine 228 may determine that a target person has been studying a product in a store for a certain amount of time, and is feeling concerned about purchasing the product due to facial characteristics captured in video feed data. Moreover, decision engine 228 may determine that the target person has performed research on the product for the past six months based on information contained in the target person's complex profile. Accordingly, decision engine 228 may decide to offer the target person a discount on the product to entice the target person to complete the purchase of the product. The discount may be communicated to the target person via user device 140. Discounts may be personalized discounts or general discounts that are available to the population. Personalized discounts may be based on information contained in a target person's complex profile, or information determined from sensor data. Discounts may also be time dependent. For example, discounts may be valid only for a certain amount of time (such as 1 hour). A reminder may be associated with a time dependent discount. For example, a reminder may be triggered by an application of user device 140 when a time dependent discount is within a time period of expiring or becoming valid. Discounts may only be applicable on certain products or on certain stores. Discounts may be in the form of a QR code or text code that is displayed on user device 140. Discounts may alternatively be any other configuration of providing a discount, such as communicating the discount to the purchase terminal of a retailer, or communicating the discount to a target person's credit, debit, or other financial account. A discount may be to a retail store located within a predetermined distance of a location of a target person, or a retail store in a predetermined location. Discounts may change as a target person buys products, or walks to certain regions of a city, shopping mall, or store.

Moreover, the experience may be determined by associating the determined context with at least one stored experience. For example, the determined context may indicate that the target person is unsure about purchasing a product. The determined context may be associated with at least one stored experience of offering a discount, or directing a retail assistant to the target person to assist the target person. The at least one stored user experience may be modified based on analysis of the determined context. For example, when the at least one stored experience is a discount, the amount of the discount may be changed in relation to the determined context. Here, for example, a stored experience may be a discount having a first discount amount as a default discount amount. However, when the determined context indicates that the target person is about to leave a store or is very concerned with the price, the stored discount amount may be modified to be a greater discount than the default discount amount. The determined experience may then be associated with the stored experience to reflect the stored experience's contents. The determined experience may be communicated to a device of the target person.

Alternatively (or in addition), decision engine 228 may determine whether to communicate with one or more store clerks and direct one or more of them to assist the target person. This determination may be based on satisfaction of the target person (through mood determination) and whether the target person would be receptive to direct engagement by a store worker, or engagement through user device 140. For example, a store clerk who specializes in the product the target person is studying may be summoned to assist the target person. Alternatively, a store worker (or computerized assistance system) may be directed to communicate, call, or text a user device 140 of the target person to engage the target person. In addition, decision engine 228 may determine that a mood of the target person is not amiable to direct engagement by a sales clerk. Decision engine 228 may communicate with one or more store clerks and direct one or more of them not to assist or approach the target person.

Decision engine 228 may also tailor the ambiance of a location based on the determined situation of step 450. For example, decision engine 228 may determine from a target person's complex profile that the target person or a person in the target person's group enjoys a certain type of music or a certain type of lighting in a store when shopping. Accordingly, decision engine 228 may adjust the background music in a store to the target person's preference when a target person enters the store, or adjust the lighting level in a store or a region of the store to that which the user prefers. Alternatively, or in addition, decision engine 228 may make an estimation of such a preference if there is no complex profile information for the target person or for the person in the target person's group. For example, if a child does not have a complex profile, but is accompanying the target person, decision engine 228 may estimate that the child enjoys a certain music artist based on determined information on the child, such as the child's age, or information detected in sensor information. Decision engine 228 may adjust the background music in a store to the child's preference, provide a targeted advertisement, or adjust other aspects of the environment that the child may be interested in.

Decision engine 228 may also determine a targeted advertisement for the target person. For example, decision engine 228 may determine that the target person has an interest in a certain product based at least on the target person's interests, age, personal demographics (e.g., race, nationality, gender, etc.), and/or clothing style as described in their complex profile. Decision engine 228 may then broadcast targeted advertisements to the target person's user device 140 or to displays or devices located in the environment in proximity to the user. For example, a certain product or object may be detected by video analyzer 216 within video feed data. Decision engine 228 may determine an advertisement that is related to the detected product or object, and determine that an experience for the target person is the advertisement. Decision engine 228 may then broadcast targeted advertisements to the target person's user device 140 or to displays or devices located in the environment in proximity to the user In another example, decision engine 228 may determine that a target person in an environment is acting suspiciously. Decision engine 228 may determine that a target person has been pacing between certain landmarks in an environment for a certain amount of time. Decision engine 228 may also determine, from information in the target person's complex profile, that the target person has been previously escorted from the environment by law enforcement multiple times in the past 6 months, or within some other specified time period. Accordingly, decision engine 228 may communicate to security personnel in the environment to confront the target person.

In another example, appliance 110 (and/or cloud 120) may be used in an airport environment to record individuals in an airport terminal, individuals entering and exiting a plane, and the like. Decision engine 228 may determine, from captured sensor data, that a detected person is a traveler or a family member, and may determine that a person has a specific travel itinerary. Decision engine 228 may determine whether a traveler exiting a plane has a connecting flight or not. Decision engine 228 may also determine how long a person spends near retail stores, restaurants, and gates within the airport. Experiences (as will be discussed) may be broadcast to a device of the person, where the experiences may be tailored to the stores, products, restaurants, and the like that the person interested in or near. Experiences may include recommendations to visit certain attractions in the airport. The recommendations may be based on other travelers in the current airport or in different airports who have similar interests to the person, or in a similar demographic as the person.

Privacy settings may be implemented for data gathered by complex manager 224 and 324, and social media analyzer 220 and 320. For example, both complex manager 224 and social media analyzer 220 may abide by privacy settings that ensure proprietary information regarding a person or specified information regarding a target person is not gathered to generate a complex profile or influence a determination by decision engine 228. Privacy settings may also be determined and set based on government rules, regulations, and laws.

Figure 5:
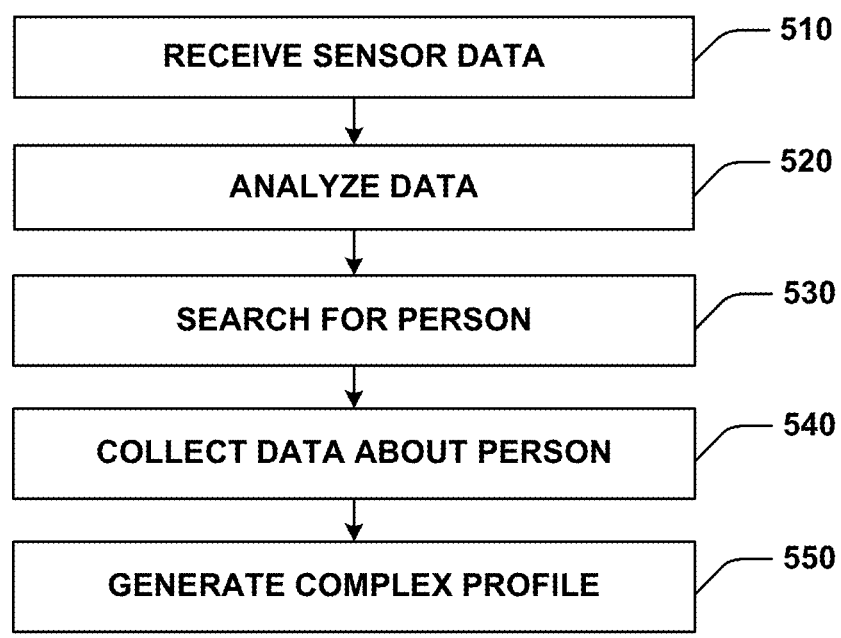
FIG. 5 is a flowchart representing an exemplary method for generating a complex profile, consistent with embodiments of the present disclosure.

FIG. 5 is a flowchart 500 representing an exemplary method for generating a complex profile by complex manager 224 or 324, consistent with embodiments of the present disclosure. The number and sequence of operations in FIG. 5 are provided for purposes of illustration and may be modified, enhanced, substituted, or otherwise changed, in view of the present disclosure. In some embodiments, method 500 may be implemented as one or more computer programs executed by one or more processors. Moreover, in some embodiments, aspects of method 500 may be implemented by an appliance (e.g., appliance 110 having one or more processors executing one or more computer programs stored on a non-transitory computer readable medium). In some embodiments, aspects of method 500 may be implemented by a cloud (e.g., cloud 120 having one or more processors executing one or more computer programs stored on a non-transitory computer readable medium).

In some embodiments, example method 500 may include receiving sensor data at 510. Cameras 116 and microphones 118, for example, may collect video feed data and audio feed data from an environment. Such data may include data relating to a target person, including, but not limited to, a customer, potential customer, person that may be security risks, and others, and may be fed, for example, to video analyzer 216 and audio analyzer 218 for analysis.

In some embodiments, example method 500 may include analyzing sensor data at 520. For example, video analyzer 216 may analyze the video feed data to detect the person's face using facial detection techniques. Video analyzer 216 may also determine the age, race, and dressing-style of the target person recognized in the video feed data. As discussed above, a detected face may be extracted and representative facial data may be determined.

Audio analyzer 218 may analyze the audio feed data to determine characteristics of the target person's voice if it is present in the audio feed data. For example, audio analyzer 218 may determine intonation, speed, inflection, slurring, accent, and other characteristics of a voice in the audio feed data. As discussed above, a detected voice may be extracted and representative audio data may be determined.

In some embodiments, example method 500 may include searching for the target person who is present in video feed data and audio feed data at 530. Here, for example, social media analyzer 220 may scour the internet in an attempt to match the detected face from video feed data with a predetermined set of pictures and/or videos present on public social media profiles. Social media analyzer 220 may alternatively or in addition scour the internet to determine whether an audio signature from the audio feed data of microphone 118 matches audio from a predetermined set of video recordings, microphone recordings, or any other audio recordings located on social media profiles. Face match confidence and audio match confidence ratings may respectively be generated by social media analyzer 220. Both of these ratings may be utilized to form an overall profile match confidence. Social media analyzer 220 may recover one or more social media profiles that may be associated with the target person recognized in the video feed data. If multiple social media profiles recovered by social media analyzer may be associated with the target person, social media analyzer may perform further analysis on an extended set of pictures, videos, and audio from the profiles, that is greater than the predetermined set, for example, to determine which one is associated with the target person.

Social media analyzer 220 may also utilize other data to determine whether a recognized target person matches a social media profile. For example, location, comment, product, time, and other data present on the social media profile may be utilized to draw correlations between information present in sensor data. For example, social media analyzer 220 may detect location data, comment data, or "check in" data that is posted to a social media profile and indicates the target person is present in the environment captured by camera 116 at time of face recognition.

Social media analyzer 220 may determine a face match confidence for the match between the detected face in the video feed data and pictures located on a social media profile by analyzing similarities between the recognized face and faces in the pictures. Facial matching techniques known in the art may be utilized. Some or all of pictures and/or videos found from a social media profile may be analyzed. A face match confidence may be determined via the matching recognized faces to faces in images and/or videos.

Social media analyzer 220 may also use data regarding other recognized faces within the video feed data. For example, the face of a child, family member, or friend of the target person may also be detected in video feed data. This other detected face may be matched to pictures and/or videos on the target person's social media profile to increase the face match confidence. For example, a person may be present in an environment with her child. Cameras 116 may record video feed data of both the person and her child, and video feed analyzer 216 may recognize faces of both the target person and her child within the video feed data. Social media analyzer 220 may match the person to a picture located on a social media profile, and may additionally locate a picture of the target person and the child together, or the child alone, on the social media profile. This matching may increase a face match confidence because not only is the target person in the video feed data present in the recovered social media profile, but also other people associated with the target person who are present in the video feed data.

Social media analyzer 220 may also use an audio signature from the audio feed data of microphone 118 to determine whether video recordings, microphone recordings, or any other audio recordings located on social media profiles match the audio signature. For example, audio analyzer 218 may determine that a target person has a certain audio signature. Social media analyzer may match the audio signature to a voice that is present in a video uploaded to a social media profile. An audio match confidence may be generated that represents a confidence that the audio signature matches the audio from the uploaded video.

As discussed, face match confidence and audio match confidence ratings may respectively be generated by social media analyzer 220. Both of these ratings may be utilized to form a profile match confidence. Once the profile match confidence is above a predetermined threshold, a profile match between the person recognized in sensor data and the social media profile may be attained.

To verify a profile match, a confirmation message may be sent to a target person via user device 140. For example, a push notification may be sent to a user device 140 asking a target person whether a matched profile is associated with the target person. The notification may include incentives that are awarded to the target person if the target person confirms that the profile is indeed associated with the target person.

In some embodiments, example method 500 may include collecting data about the target person who is present in sensor data at 540. Collected data may include information about the target person, and may be collected from at least one server. The information may be from at least one social media profile. For example, once a match between the recognized target person and a social media profile is determined, the social media profile may be scoured by social media analyzer 220 to determine and collect information about the target person. For example, personal information (such as a person's name, address, date of birth, alma mater, work-place, etc.), relationship information (such as the person's friends and family, relationship status, anniversary, etc.), likes and preferences of the target person, and other information related to the target person's life may be collected. Posts and comments on the target person's social media profile, made by the target person and by other social media users, may also be collected. Social media analyzer 220 may also scour posts and comments on other user's social media profiles, made by the target person, or that have tagged the target person, to determine information about the target person, and information in these items may be collected. Social media analyzer 220 may also determine whether a target person follows or tracks certain products, stores, people, companies, celebrities, etc., via their social media profile, whether a target person has indicated approval for certain posts or comments via their social media profile, and whether the target person has forwarded certain posts or information contained on social media, and collect information related to these items. Social media analyzer 220 may also collect information on location data posted on the person's social media profile, such as location data about certain stores, events, or locations that the user has visited, and the time and date of such visits.

Data entered via I/O devices 204 may also be collected. For example, a client user such as a store attendant, or a target person, may use one or more I/O devices 204 (e.g., physical keyboards, virtual touch-screen keyboards, mice, joysticks, styluses, etc.) to input information into complex manager 224 for generation of a new complex profile, or updating/editing of an existing complex profile. Such information may include answers to a questionnaire or the input of information regarding the target person's personal information (such as a target person's name, address, date of birth, alma mater, work-place, etc.), relationship information (such as the target person's friends and family, relationship status, anniversary, etc.), likes and preferences, and other information related to the target person's life. In addition or alternatively, the target person may link a social media profile of the person to complex manager 224, and allow social media analyzer 220 to automatically collect information from the social media profile.

It should be noted that a target person may enter such information for generating a complex profile from any location, and need not necessarily utilize I/O devices 204. For example, a target person may utilize a user device 140 (such as a home computer, laptop, tablet, or smartphone)

from the comfort of their home or any other location and access an application or webpage for inputting information relating to the target person's complex profile, including generating a new complex profile or updating a pre-existing complex profile.

In some embodiments, example method 500 may include generating a complex profile for a target person recognized in sensor data at 550. Here, complex manager 224 may utilize the collected data to generate a complex profile for the target person. The complex profile may include preferences and dislikes, habits, relationships, past behavior in various contexts, past shopping tendencies, and other data. The complex profile may include a unique identification (ID) number that may be associated with the target person when they are recognized in future visits to environments that include the appliance 110 and/or cloud 120 capabilities. The complex profile may include information on a social media profile that has or is being used to collect data for generating or updating the complex profile. Moreover, the complex profile may include an age, address, and location of the target person, as well as information on the family members and relationships of the target person. The complex profile may also include linked account identification that includes other accounts at venders, online stores, online applications, and other internet databases. The complex profile may be stored in complex database 210 or complex database 310, or locally at complex manager 224.

Complex manager 224 may also store captured video feed data and audio data for a target person and associate such information with the generated complex profile. Such information may be used to provide an association between the target person and the target person's respective complex profile when the target person enters an environment where appliance 110 and/or cloud 120 is utilized. For example, when a target person is recognized within a video data feed captured by camera 116, appliance 110 and/or cloud 120 may use facial matching techniques to match the target person to stored image and/or video data associated with a stored complex profile. The complex profile associated with the target person may then be fetched by complex manager 224, and thereafter may be provided to decision engine 228 for a determination on user experience personalization.

Figure 6:
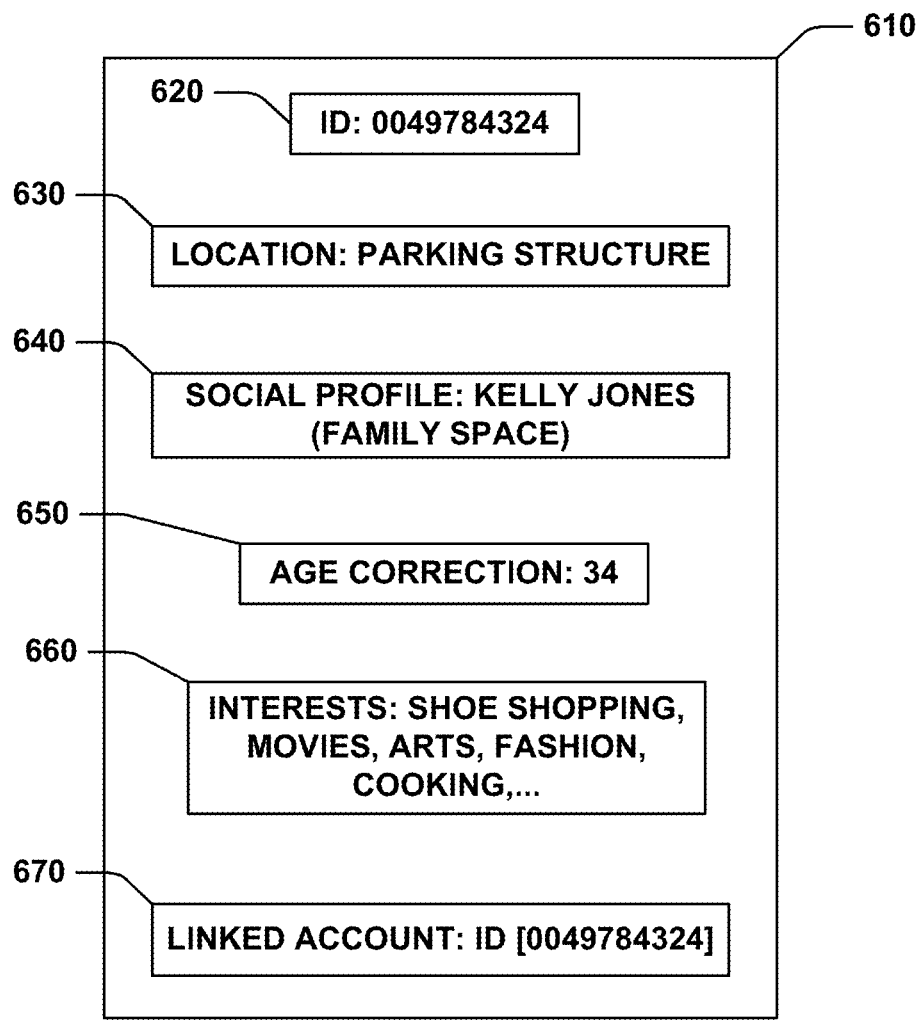
FIG. 6 is an exemplary complex profile, consistent with embodiments of the present disclosure.

FIG. 6 is an exemplary complex profile 610, consistent with embodiments of the present disclosure. Complex profile 610 is exemplary only, and may include more or less information than that shown in FIG. 6. Moreover, complex profile 610 may be constantly updated based on social media usage, information entered by a target person and collected by complex manager 224, and purchases made by a target person.

Complex profile 610 may include identification (ID) information 620. Here, an ID number of a particular target person who the complex profile corresponds to may be present. The ID number may be a number used by appliance 110 and/or cloud 120 in regards to the target person. For example, the ID number may be used to search and/or fetch a certain complex profile from complex DB 210, complex DB 310, or complex manager 224.

Complex profile 610 may include location information 630. Location information 630 may include information determined from video and/or audio data feeds, or social media profiles, which tells a current location or a last known location of a target person. For example, video feed data provided by cameras 116 may include objects, landmarks, street signs, and/or sign posts. Video analyzer 216 may recognize such items, determine a location of the target person, and may provide such location information to complex manager 224. In one example, a target person may be present in a video feed along with a sign that indicates that the target person is located in a parking structure of a shopping mall. Video analyzer 216 may recognize the target person and the sign, and determine that the target person is located in the parking structure. Video analyzer may provide this information to complex manager 224, which updates the location information of the target person's complex profile.

Complex profile 610 may include social profile information 640. Social profile information may include information relating to from which social media profile the complex profile has or is collecting information. For example, social profile information 640 may include data that shows information has been collected from a target person's "Family Space" social media account. The social profile information 640 may also include data that indicates a name of the target person. For example, "Kelly Jones" may be the name of the target person associated with complex profile 610. Social profile information 640 may also include data that indicates the names of a target person on social media profiles from which information that generated complex profile 610 is collected. The name of a target person on their social media profile may be different from their given name. For example, a target person's name on their social media profile may be a nickname, use a middle name, or use a fake name known only by friends and family of the target person.

Complex profile 610 may include age correction information 650. Age correction information 650 may be data that represents an actual or estimated age of the target person associated with the complex profile. For example, the age correction information 650 may be generated from a date of birth or age found on a target person's social media profile. However, a target person may not list their age or data or birth on social media profiles. Thus, using facial and body analysis known in the art of collected images and videos of a target person, collected information on likes, dislikes, and interests of the target person, and collected information on other people's likes, dislikes, and interests, an estimated age may be generated for the target person. The age information of a target person in the complex profile 610, in addition to other information of the complex profile 610, may be used by decision engine 228 to tailor user experiences to the target person.

Complex profile 610 may include interest information 660. Interest information 660 may be determined from information collected by complex manager 224. For example, interest information 660 may include interests such as shoe shopping, movies, arts, fashion, cooking, and sports. Any other interests of a target person may be determined and included in interest information 560.

Figure 7:
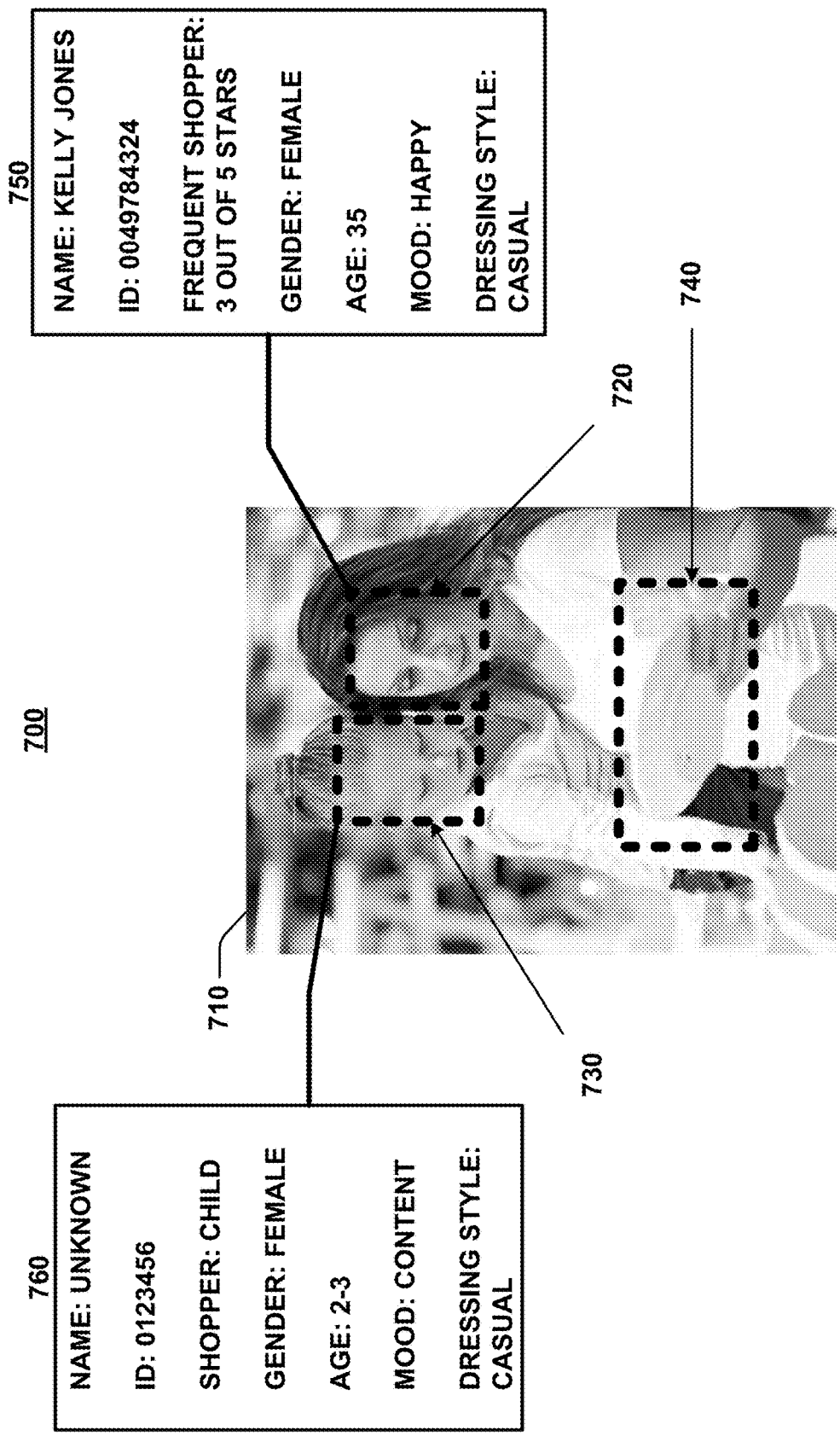
FIG. 7 shows an example of face detection and association with a complex profile consistent with embodiments of the present disclosure.

Complex profile 610 may include linked to account information 570. As discussed above, linked account information may include other accounts at venders, online stores, online applications, and other internet databases FIG. 7 shows an example 700 of face detection and association with a complex profile consistent with embodiments of the present disclosure. In example 700, a video frame 710 captured by one of cameras 116 may be analyzed by video analyzer 216. Video frame 710 may alternatively be an image frame captured by a still imager camera. Video analyzer 216 may detect a face 720 of a target person and a face 730 of a child within video frame 710. Video analyzer 216 may also detect an object 740 within video frame 710 that the target person is holding. Video analyzer may detect a mood of the target person and child by analysis of faces 720 and 730. For example, video analyzer 216 may determine that the person is in a happy mood based on her facial expressions in face 720. Video analyzer 216 may also determine that the child is content based on facial expression in face 730. Such information about faces 720 and 730 may be communicated to complex manager 224.

Complex manager 224 may determine that the target person with face 720 has a complex profile 750 by matching face 720 to previously stored images of the target person within complex DB 210 or by using image vectors. For example, complex manager may fetch complex profile 750 for the target person, and update complex profile 750 with mood information of the target person. As shown in FIG. 7, the target person with face 720 is named Kelly Jones, has an ID number of 0049784324, is a three out of five star frequent shopper, is 35 years old, and has a dressing style of casual. Complex profile 750 may be transmitted to decision engine 228. Decision engine 228 may determine a user experience for Kelly Jones based on the complex profile. For example, decision engine 228 may determine that Kelly Jones should be sent a discount or a targeted advertisement regarding the object 740 to her user device 140. Decision engine 228 may also determine whether to direct store clerk or sales associate to assist Kelly, for example.

Complex manager 224 may attempt to determine whether child with face 730 has a complex profile by matching face 730 to previously stored images of the target person within complex DB 210 or by using image vectors. However, the child may not have a complex profile. Moreover, the child may not have a social media account. Accordingly, a complex profile 760 may be generated for the child by complex manager 224 based on sensor data. As shown in the generated complex profile 760, the child's name is unknown, but is assigned an ID number in case the child later appears in an environment with appliance 110 or cloud 120. Video analyzer 216 may determine that face 730 is a child's face, that the child is aged two to three years old, and a mood of the child. For example, using facial detection techniques, video analyzer 216 may determine that the child's mood is content. Video analyzer 216 may provide information regarding sensor data to complex manager 224. Complex manager 224 may then generate complex profile 760.

Based on the identified child's mood, decision engine 228 may generate an advertisement or discount and transmit the advertisement or discount to the person's user device 140. For example, decision engine 228 may determine that the child's mood changes from content to disgruntled. Accordingly, decision engine 228 may transmit a recommendation to the target person's user device 140 for a play area or ice cream store close to the vicinity of the target person. Decision engine 228 may transmit a coupon to the target person's user device 140 for the play area or ice cream store, and suggest visiting such a location.

Figure 8:
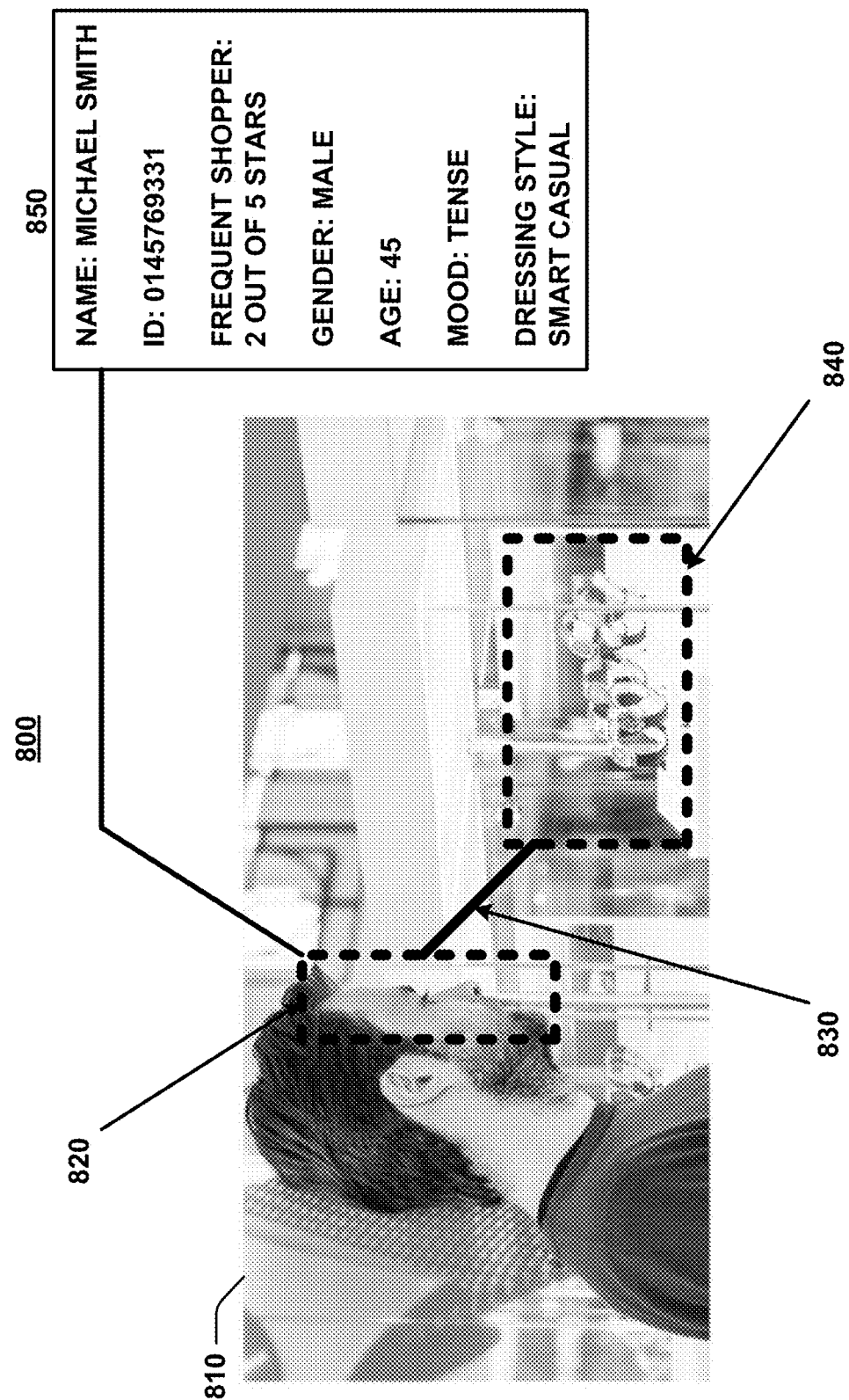
FIG. 8 shows an example of face detection and gaze direction detection consistent with embodiments of the present disclosure.

FIG. 8 shows an example 800 of face detection and gaze direction determination consistent with embodiments of the present disclosure. In example 800, a video frame 810 captured by one of cameras 116 may be analyzed by video analyzer 216. Video frame 810 may alternatively be an image frame captured by a still imager camera. A target person's face 820 and an object such as product 840 may be recognized by video analyzer 216 within video frame 810. Face 820 may be recognized as having a gaze direction 830 directed toward recognized product 840. Video analyzer may recognize that a gaze direction 830 is directed to one or multiple recognized products 840. Video analyzer 216 may determine that the target person has been looking at the product 840 with gaze direction 830 for a certain amount of time. For example, video analyzer 216 may determine that the target person's face 820 has had a gaze direction 830 toward product 840 for 12 seconds. Video analyzer 216 may detect a mood of the target person from video frame 810. For example, video analyzer 216 may determine that based on the amount of time the target person has had his gaze direction locked onto a product and the facial characteristics of the target person, the target person has a tense mood. Such information about may be communicated to complex manager 224 and decision engine 228.

Complex manager 224 may determine that the target person with face 820 has a complex profile 850 by matching face 820 to previously stored images of the target person within complex DB 210 or by using image vectors. Complex manager may fetch complex profile 850 for the target person, and update complex profile 850 with mood information of the target person. As shown in FIG. 8, the target person with face 820 is recognized, from the complex profile 850, as being named Michael Smith, has an ID number of 0145769331, is a two out of five star frequent shopper, is 45 years old, and has a dressing style of smart casual. Complex profile 850 may be transmitted to decision engine 228. Decision engine 228 may determine a user experience for Michael Smith based on complex profile 850, as well as sensor information. For example, decision engine 228 may determine that Michael Smith should be sent a discount or a targeted advertisement regarding the product 840 to his user device 140 because he is looking tense and has been looking at product 840 for a certain amount of time, which may indicate he is unsure of purchasing product 840. Decision engine 228 may also determine whether to direct store clerk or sales associate to assist Michael, for example.

For example, Michael may want to purchase a gift, such as a watch, for his wife. Michael may know that his wife likes watches, but may not be sure what kind or brand of watch she prefers, or from which store she would like a watch to be purchased. Michael may utilize an application installed on user device 140 to obtain recommendations for purchasing the watch. Michael may search for "branded watch, gift for wife" in the application on user device 140. User device 140 may transmit the search to cloud 120 or appliance 110 and gain recommendations for Michael. Complex manager 224 may retrieve the Michael complex profile 850, which may include information from his wife's complex profile about his wife's interest in watches. Michael may have activated family sharing of complex profiles, and his complex profile may include information about his wife, such as his wife's interests and preferences gathered from her complex profile. This information may include information on his wife's internet searches for watches, social media interest in watches, information on which stores his wife has frequented to look for watches, and information on when his wife was last looking for watches. Complex manager 224 may pass such information to decision engine 228. Decision engine 228 may then utilize shopping mall information, the information about his wife, and suggest watch stores and watches for Michael to visit. Decision engine 228 may map out a route to one or more watch stores, and/or the route to one or more specific products within each store. The suggestions and map information may be transmitted to user device 140 for Michael to view.

Using data from cameras 116 and audio analyzer 118, as well as purchase information regarding Michal's purchase history, appliance 110 and/or cloud 120 may determine that Michael has visited each suggested store, but has still not purchased a watch. Moreover, appliance 110 and/or cloud 120 may determine that Michael's mood is agitated or tenser than it has previously been during that day. Accordingly, decision engine 228 or 328 may draw from Michael's complex profile to suggest activities that may calm Michael. For example, decision engine 228 may determine from Michael's interests that he likes coffee from a certain coffee shop. Decision engine 228 may recommend that Michael pause his watch search, and visits the coffee shop. Decision engine 228 may suggest the closest location(s) of his favorite coffee shop, and map out the route to each location. Decision engine 228 may communicate the recommendation and map information to user device 140. Decision engine 228 may instead provide Michael with a coupon to make the purchase, as previously discussed above. Decision engine 228 may provide both options to Michael at the same time, provide one option before the other, or select which option to provide to Michael and discard the unselected option.

Cameras 116 may detect Michael eventually purchasing a watch for his wife. Additionally, the purchase may be detected via analysis of Michael's collected purchase history. Video analyzer 216 may recognize Michael's face during and after the purchase is made, and may determine his mood both during and after the purchase. For example, video analyzer 216 may determine that Michael's mood has changed from tense before and during the purchase to relieved after the purchase. Complex manager 224 may update Michael's complex profile with such mood information, and decision engine 228 may determine that Michael's shopping experience was satisfying. All information regarding Michael's shopping experience may be used to update Michael's complex profile 850, and therefore may be used to enhance Michael's later shopping experiences.

Figure 9:
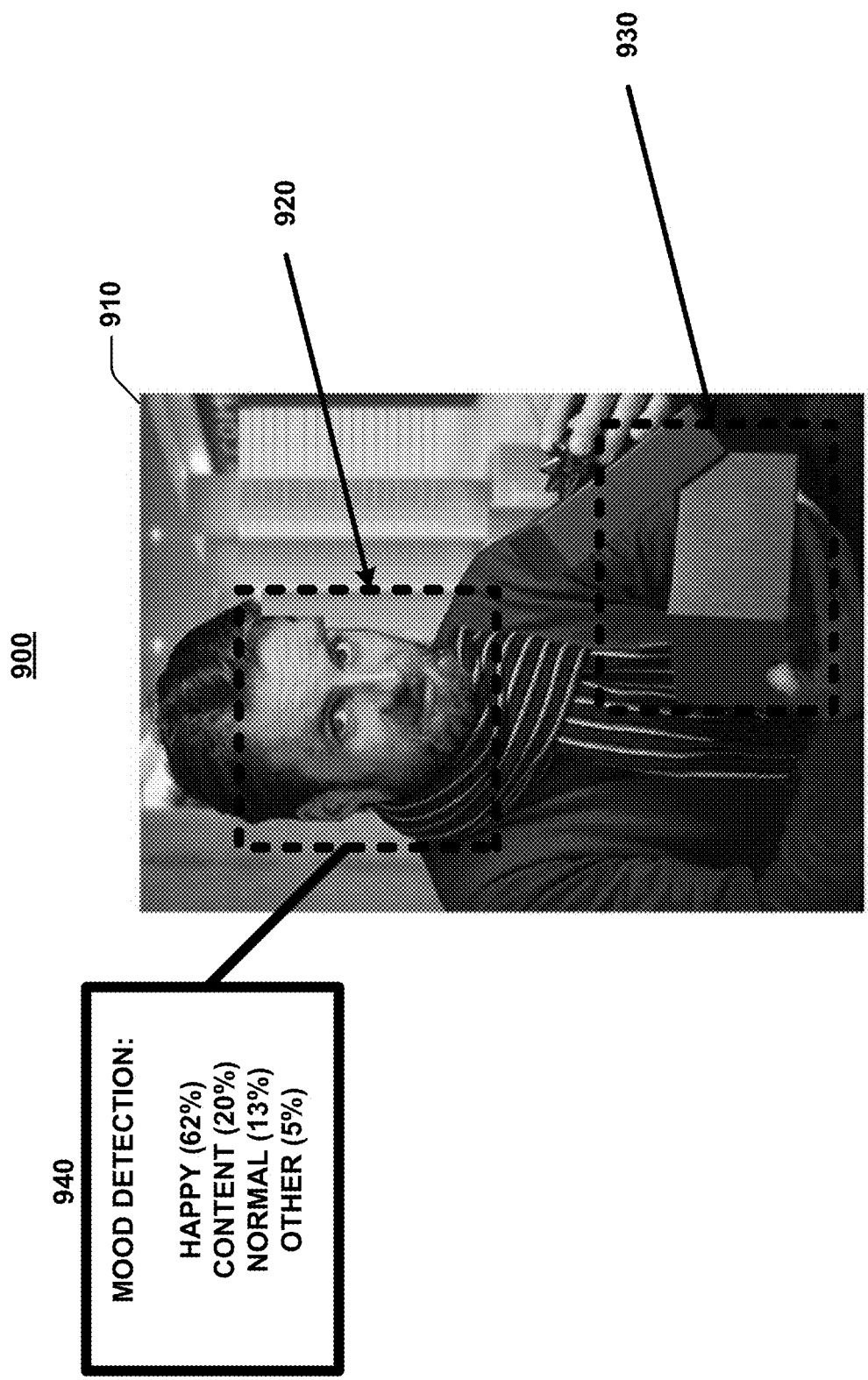
FIG. 9 shows an example of mood detection consistent with embodiments of the present disclosure.

FIG. 9 shows an example 900 of mood detection consistent with embodiments of the present disclosure. In example 900, a video frame 910 captured by one of cameras 116 may be analyzed by video analyzer 216. Video frame 910 may alternatively be an image frame captured by a still image camera. A target person's face 920 may be recognized by video analyzer 216 within video frame 910. An object 930 may also be recognized by video analyzer 216. For example, the object 930 may be recognized, based on prior tracking, analysis, purchase history, and recommendations provided to the target person, as being a product that the user has purchased. Video analyzer 216 may determine whether the target person's detected face 940 exhibits one or more moods. Each mood may be determined in percentages. In example 900, the person's face is determine by video analyzer 216 as being 62% happy, 20% content, 14% normal, and 5% other moods. The other moods may be, for example, insignificant or undetermined mood(s).

Figure 10A:
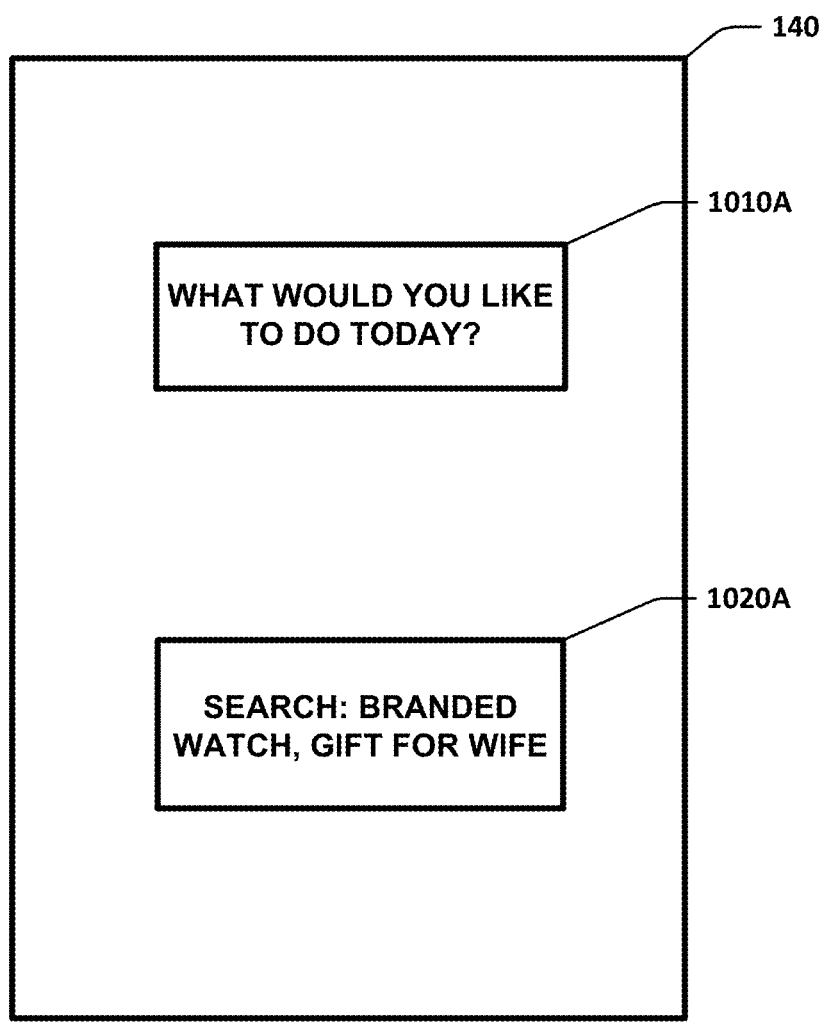
FIG. 10A shows an exemplary application user interface consistent with embodiments of the present disclosure.

FIG. 10A shows an exemplary application user interface 1000A consistent with embodiments of the present disclosure. In FIG. 10A, an example of query 1020A is displayed on the surface of user device 140. The query may request what a person would like to do that day, or whether the user has any particular tasks that they would like to achieve. Query 1020A may be any kind of query as generated by any one of appliance 110 and cloud 120 and communicated to user device 140, or generated by user device 140 alone.

In region 1020A, a target person may input an answer to the query, or any sort of input they like that relates to the query or not. The input provided by the target person may be analyzed and recommendations may be displayed on user device 140. A target person may input into region 1020A by keyboard, touchscreen, or any other input device. A parson may input into region 1020A via a microphone. For example, a target person may speak into a microphone, and the detected voice data may be translated into an input. The input may be translated into text displayed on user device 140, or may instead only be processed as an input and not shown in text on user device 140.

Figure 10B:
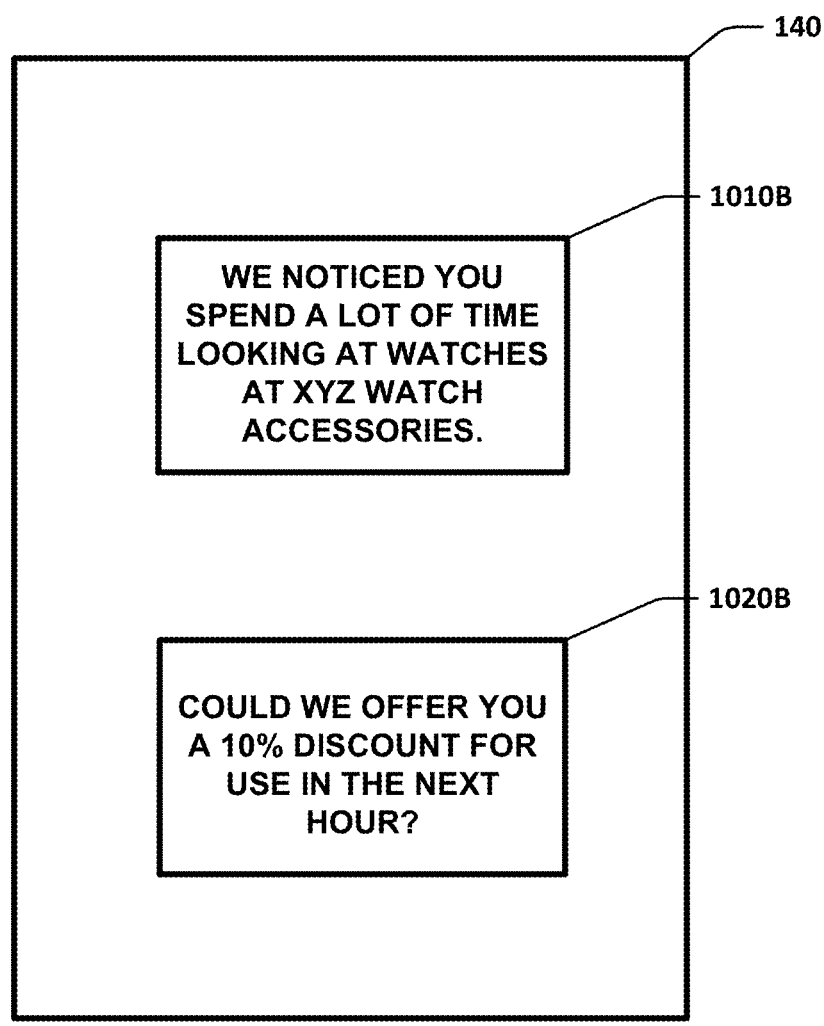
FIG. 10B shows another exemplary application user interface consistent with embodiments of the present disclosure.

FIG. 10B shows another exemplary application user interface 1000B consistent with embodiments of the present disclosure. In FIG. 10B, an example of a communication from appliance 110 and/or cloud 120 is shown as displayed on user device 140 at region 1010B. The communication may be based on a determination by decision engine 228 generated from analysis of sensor data and complex profile data. In region 1020B, another communication may be presented to a user. The communication in region 1020B may also be based on a determination by decision engine 228 generated from analysis of sensor data and complex profile data. For example, the communication in region 1020B may be in regard to a discount or suggestion for the target person generated from analysis of sensor data and complex profile data.

Figure 11:
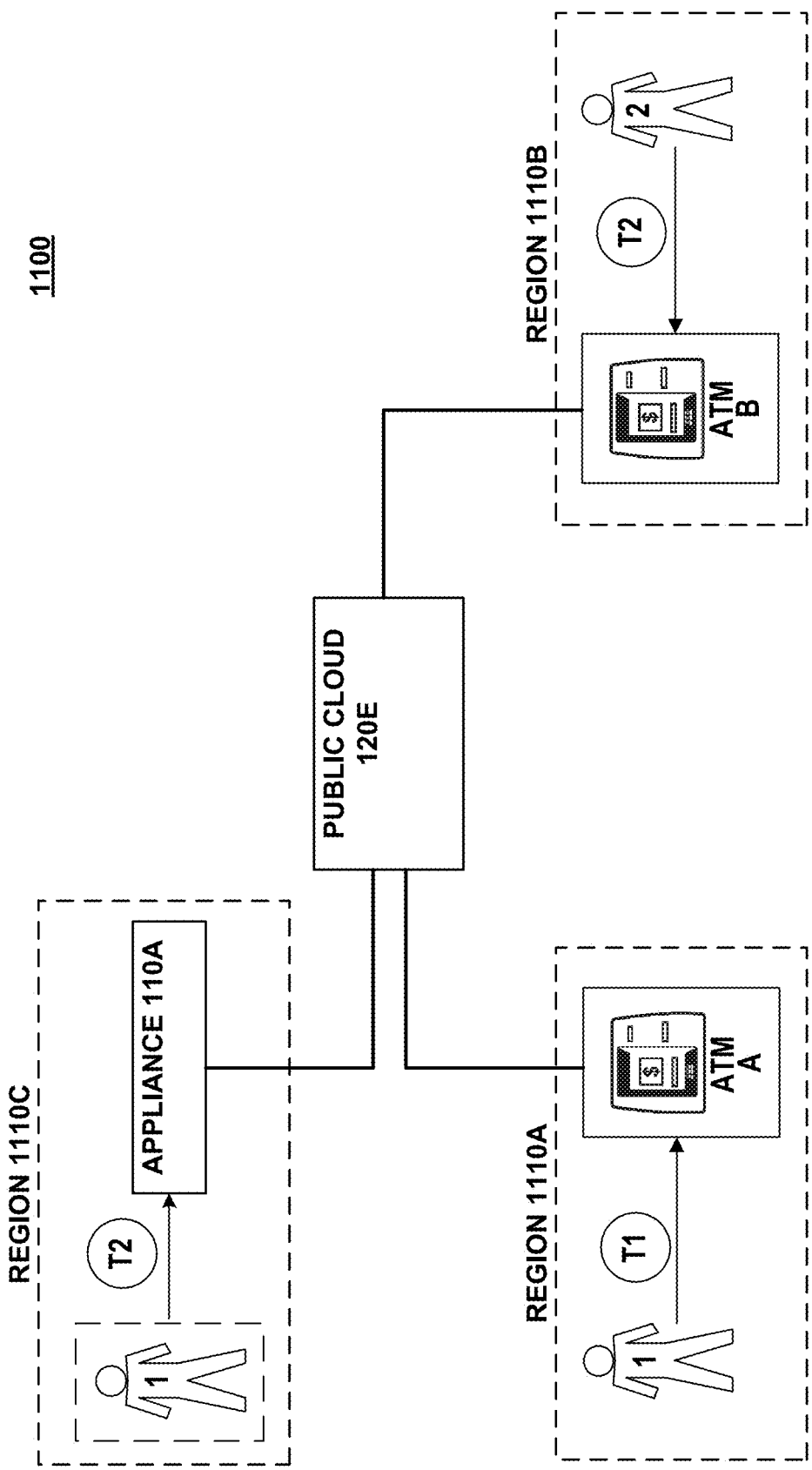
FIG. 11 shows an example consistent with embodiments of the present disclosure.

FIG. 11 shows an example 1100 of fraud detection consistent with embodiments of the present disclosure. At time T1, a user 1 may operate ATM A in region 1110A. ATM A may be an ATM outfitted with a camera and/or other sensor device for surveillance, which provides sensor data to public cloud 120E. Public cloud 120E may perform analysis and processing on collected sensor data as previously discussed. ATM A may also provide transaction and account usage data to public cloud 120E. Public cloud 120E may correlate transaction and account usage data to the sensor data provided by ATM A. For example, public cloud 120E may correlate facial data and/or audio data from a complex profile of user 1 to the captured sensor data at ATM A, and may link the transaction and account data of user 1 to the complex profile of user 1. Thus, public cloud 120E may link sensor data to bank transaction and account data. Public cloud 120E therefore may verify that user 1 is actually withdrawing money from ATM A, and help detect when an imposter is fraudulently withdrawing money from an ATM using user 1's account information.

ATM A, however, may also be outfitted with a fraudulent device, such as a card skimmer or keypad camera. For example, ATM A may be outfitted with a card skimmer that fraudulently copies card data from the ATM card of user 1. When user 1 operates ATM A, user 1 may therefore have his account information stolen.

User 2 may be obtain the stolen account information from user 1. At time T2, user 2 may attempt to operate ATM B using the account information stolen from user 1, and may attempt to withdraw cash or perform other account transactions in regard to user 1's bank account. ATM B may also be outfitted with a camera and/or other sensor device for surveillance that provides sensor data to public cloud 120E.

When user 2 attempts to use ATM B using user 1's account information, public cloud 120E may recognize that the sensor data (capturing user 2) provided by ATM B does not correlate to the transaction and account information that is being provided by user 2 to ATM B. For example, public cloud 120E may determine that the facial data of user 2 does not match the facial data (of user 1) that is associated with the account information (of user 1) being used by user 2 to access ATM B. Accordingly, public cloud may command ATM B to stop the transaction involving user 2, and lock user 1's bank account. The command may be made in real-time. Alternatively or in addition, public cloud 120E may send a notification to a user device (such as a smart phone, telephone, computer, tablet, laptop, desktop, etc.) of user 1 requesting that user 1 verify that transaction. For example, the notification may request that user 1 confirm that the transaction by user 2 at ATM B was fraudulent, or that the transaction by user 2 was authorized.

Alternatively or in addition, at time T2, user 1 may be detected in region 1110C by appliance 110A at the same time that user 2 is attempting to operate ATM B using user 1's account information. For example, the voice or face of user 1 may be recognized by appliance 110A, and the identification data may be forwarded to public cloud 120E. Public cloud 120E may determine that sensor data related to user 1 is being recognized by appliance 110A. Accordingly, if public cloud 120E determines that user 1 is captured in sensor data in one region (e.g., region 1110C), but that user 1's account information is being used to operate an ATM (e.g., ATM B in region 1110B), public cloud 120E may command ATM B to stop the transaction involving user 2, and lock user 1's bank account. The command may be made in real-time. Alternatively or in addition, public cloud 120E may send a notification to a user device (such as a smart phone, telephone, computer, tablet, laptop, desktop, etc.) of user 1 requesting that user 1 verify that transaction.

Figure 12:
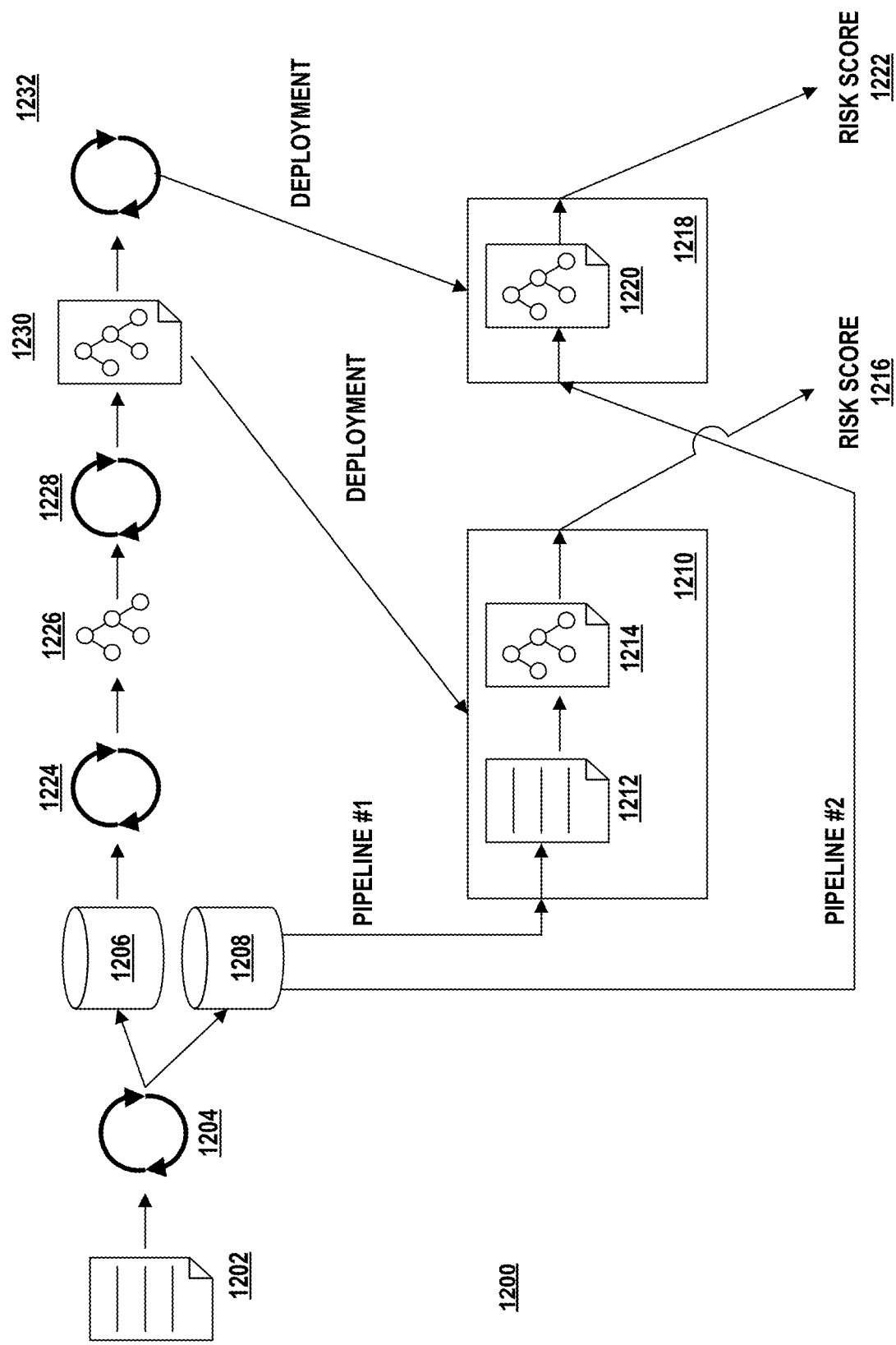
FIG. 12 shows an example workflow consistent with embodiments of the present disclosure.

FIG. 12 shows an example workflow 1200 that may provide analysis, discovery, and/or prediction of fraudulent ATM activity consistent with embodiments of the present disclosure, and that may combat against the fraud as discussed in relation to FIG. 11. The embodiment of FIG. 12 is in no way limited to only being applicable to the situation of FIG. 11, and may be applied to any number of settings.

Configuration file 1202 may be provided to a processor running workflow 1200. For example, configuration file 1202 may include data indicating the kind of processing that the processor running workflow 1200 should perform. The processor running workflow 1200 may be a server, database, or any other kind of processing device.

At data generator 1204, data may be received from appliance(s) 110 and/or cloud(s) 120, and data may be generated that includes various data indicating matches between subjects in sensor data and their respective complex profiles, as well as extracted data from sensor data, such as video and audio data, as discussed above. This data may be partitioned into training data 1206 and test data 1208.

Training data 1206 may be used to provide training 1224 to generate one or more models 1226 for analyzing and processing an environment. For example, training data 1206 may be used to determine a model 1226 from captured appliance and/or cloud data of a shopping mall that determines moods of shoppers, or propensity for shoppers exhibiting certain characteristics to complete a purchase. In another example, training data 1206 may be used to determine a model 1226 from captured ATM surveillance sensor data and transaction data from ATMs to determine risk scores regarding fraud committed at ATM locations.

Model 1226, for example, may include one or more statistical and/or machine learning models. Model 1226 may developed and saved in a format 1230. Formal 1230 may be a PMML format, or any other suitable format. Format 1230 may alternatively be a non-PMML format, and the model 1226 in format 1230 may be converted into a PMML format.

For example, model 1226 may include a global ATM model, a per user model, and/or a per ATM model. One or more of the models may be refreshed daily, or refreshed periodically. Each model may be configured to assign one or more risk scores to identify and analyze a virus, discover a virus, and/or predict a virus. Model 1226 may include analysis performed on historical data using linear regression techniques.

For example, the per ATM model may analyze one or more ATM transactions at an ATM (e.g., ATM A or B of FIG. 11), and generate a comparison with historical ATM data. The per ATM model may determine if there is a pattern in ATM data using tools such as time series change detection and CUSUM, for example.

For example, the per user model may analyze a user (e.g., user 1), and generate a comparison with historical user transaction data. The per user model may determine whether there is a pattern in user transaction data, and/or whether there are changes in user transaction data, using tools such as time series change detection and CUSUM.

For example, the per ATM model and per user model may pro-actively detect a fraudulent activity at one or more ATMs (e.g., ATM A and/or B) before an attack is reported. ATM data and user transaction data may each include a respective baseline data level that represents normalcy. When a new transaction is performed, the system may check whether the transaction is different enough from the baseline to be suspected as a potential attack. For example, a transaction monetary amount and/or time of transaction may be determined, and compared to a baseline data level. If the transaction monetary amount and/or time of transaction is within a predetermined acceptance range, then the transaction may be determined as being normal. However, if the transaction monetary amount and/or time of transaction is outside of a predetermined acceptance range, then the transaction may be determined as being abnormal, and a flag may be generated indicating that the transaction may be fraudulent. Moreover, sensor data may be captured and analyzed from each ATM that correlates to transaction and/or account information, and may further be used to determine whether a transaction is fraudulent as discussed previously.

ATMs A and B may be subject to virus attacks. The global ATM model may detect whether an ATM (e.g., ATM A and/or B) is the root cause of a virus attack (or other fraudulent activity) by assigning risk scores to individual ATMs. The global ATM model may use linear regression to analyze historical ATM data to determine at least one risk score for each ATM.

For example, a transaction by user 2 may be initiated at ATM B in FIG. 11. A model including the global ATM model, the per user model for user 1, and/or the per-user model for ATM B may be applied to the transaction. Thus, three scores may be generated from each of these models for the transaction by user 2. The scores may be used to indicate whether the transaction is potentially a root cause for future virus attacks, or whether the transaction is an actual attack, such as an unauthorized withdrawal or a virus upload. A merging procedure may be used to merge all of the scores together, or at least two of the three scores together, and produce a final recommendation as to whether or not the transaction should be considered suspicious.

When providing this processing for a transaction by user 2 at ATM B, the following steps may be performed. First, for the per user and per ATM model for the transaction may be initiated for user 2 and ATM B. Moreover, the global ATM model may also be initiated. The global ATM model may be the same for all users and ATMs. Next, the selected models may be initiated by the system environment 1200. The processing may be implemented on one or more servers, that may be the same or different servers.

The transaction data for user 2 at ATM B may then be provided to the models for analysis. Each model may generate a risk score based on the transaction data. Risk scores may then be merged to form a recommendation regarding whether the transaction is infected with a virus or is otherwise fraudulent, discover whether the transaction includes a virus upload and/or is otherwise fraudulent, and/or predict the likelihood that the transaction includes a virus infection and/or is fraudulent.

As identified in FIG. 12, test data 1208 may be used to validate the one or more models 1226 generated by training data 1206. For example, test data 1208 may be sent via pipeline 1 to deployment infrastructure 1210. Model 1226 in format 1230 may be deployed to deployment infrastructure 1210. Model 1226 may then be validated by training data 1208, and a data transformation 1212 may be performed to refine model 1226 using test data 1208. A final model 1214 may then be generated, and final model 1214 may be configured to generate a risk score 1216 that, for example, indicates whether an ATM transaction is fraudulent, or the root cause of a virus attack.

Test data 1208 may also be communicated to deployment infrastructure 1218 via pipeline 2. Model 1226 in format 1230 may be updated with more data via embedded data transformations 1232. The embedded data transformations 1232 may update model 1226, and allow model 1226 to account for additional characteristics or situations that may be present in collected data. The updated model may be communicated to deployment infrastructure 1218 and may then be validated by training data 1208. An updated final model 1220 may then be generated, and updated final model 1220 may be configured to generate a risk score 1222 that, for example, indicates whether an ATM transaction is fraudulent, or the root cause of a virus attack, based on updated data.

System environment 1200 may process amounts of data, including huge amounts of data from one or more different data sources in batch mode and/or real time mode. The batch mode may include historical analysis of collected data from one or more data sources. The real time mode may include real-time analysis and recommendations from the collected data from one or more data sources.

Figure 13:
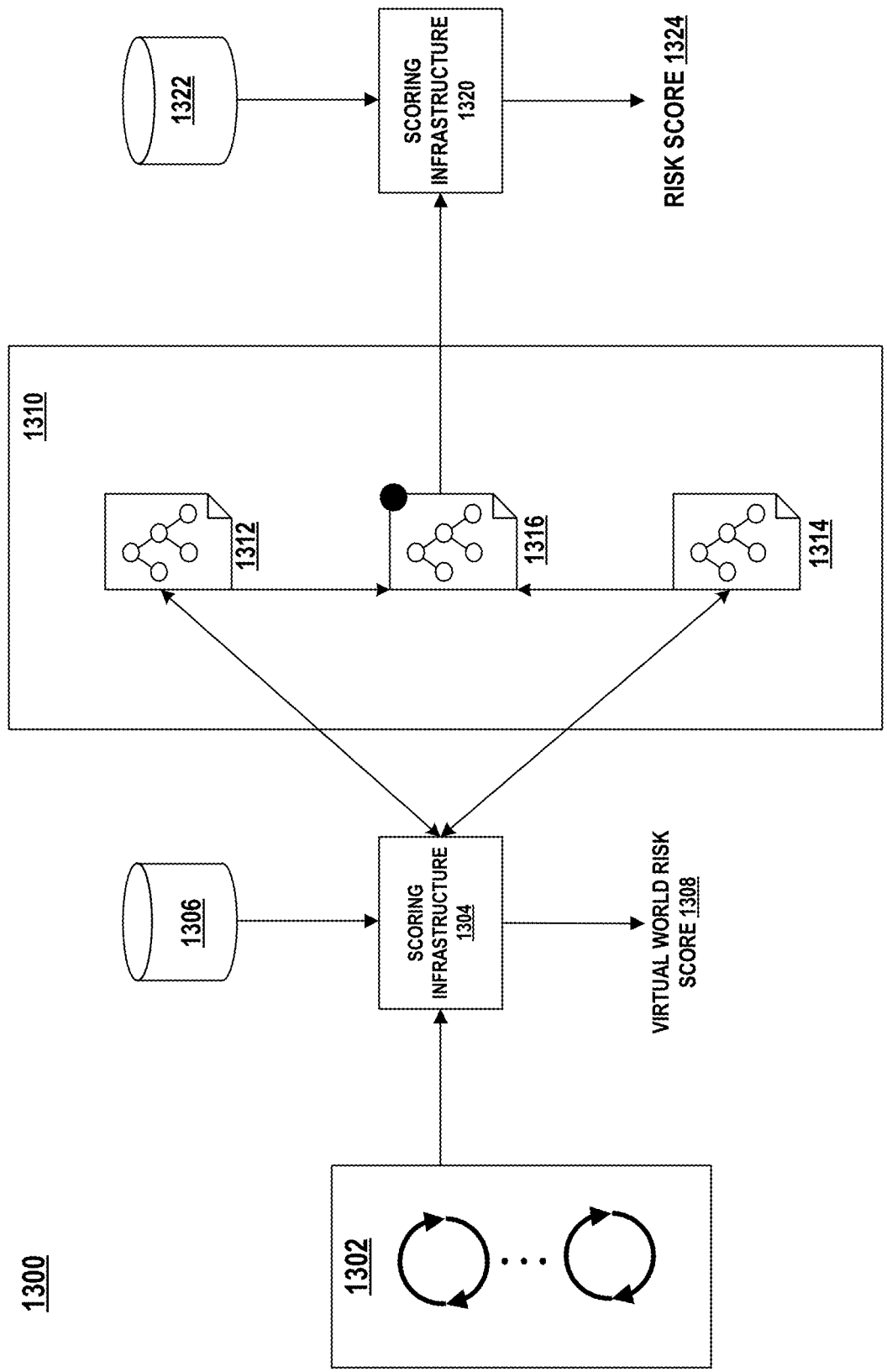
FIG. 13 shows an example consistent with embodiments of the present disclosure.

FIG. 13 shows another example consistent with embodiment of the present disclosure that may provide virus detection and/or fraud detection.

Data transformer 1302 may provide normalization of collected sensor data provided by an appliance 110 and/or a cloud 120. Scoring infrastructure 1304 may receive data from virtual world database 1306 and may generate a virtual risk score 1308. To create a virtual world database 1306, collected sensor data from on region may be collected. In addition, other data, such as transaction and account data from ATMs in a different region, may be collected. These data may be used to generate virtual world data in database 1306, and a virtual world scoring infrastructure 1304 that may allow for simulations of virtual world data set. Virtual world risk score 1308 may be generated related to the virtual world data set. For example, scoring infrastructure 1304 may generate a virtual world risk score 1308 in regard to whether a simulated ATM transaction is fraudulent by analyzing virtual world data of a simulated ATM transaction.

Model 1310 may include one or more of a virtual world model 1312 and a generic model 1314. Virtual world model 1312 may be generated from scoring infrastructure 1304, and may represent a refined model generated from simulations of a virtual world data set. Generic model 1314 may be a generic model that has baseline features in regard to a dataset. For example, generic model 1314 may be a general model that has not been trained with any virtual data. Model 1310 may include a generic model with data transformation 1316. Model 1316 may be generated by merging virtual world model 1312 with generic model 1314. One or more of model 1312 and 1314 may be utilized by scoring infrastructure 1304 to generate the virtual world risk score 1308. Generic model with data transformation 1316 may be provided to scoring infrastructure 1320.

Client database 1322 may include information gathered from various sources, and may include user transaction data, bank account data, and ATM data. Data from client database 1322 may be provided to scoring infrastructure 1320. Scoring infrastructure 1320 may determine an ATM/machine at risk of fraud or virus infection, an ATM/machine that is likely infected with a virus or that has been fraudulently accessed, and/or an infected/fraudulently accessed ATM/machine, and generate a risk score 1324.

Figure 14:
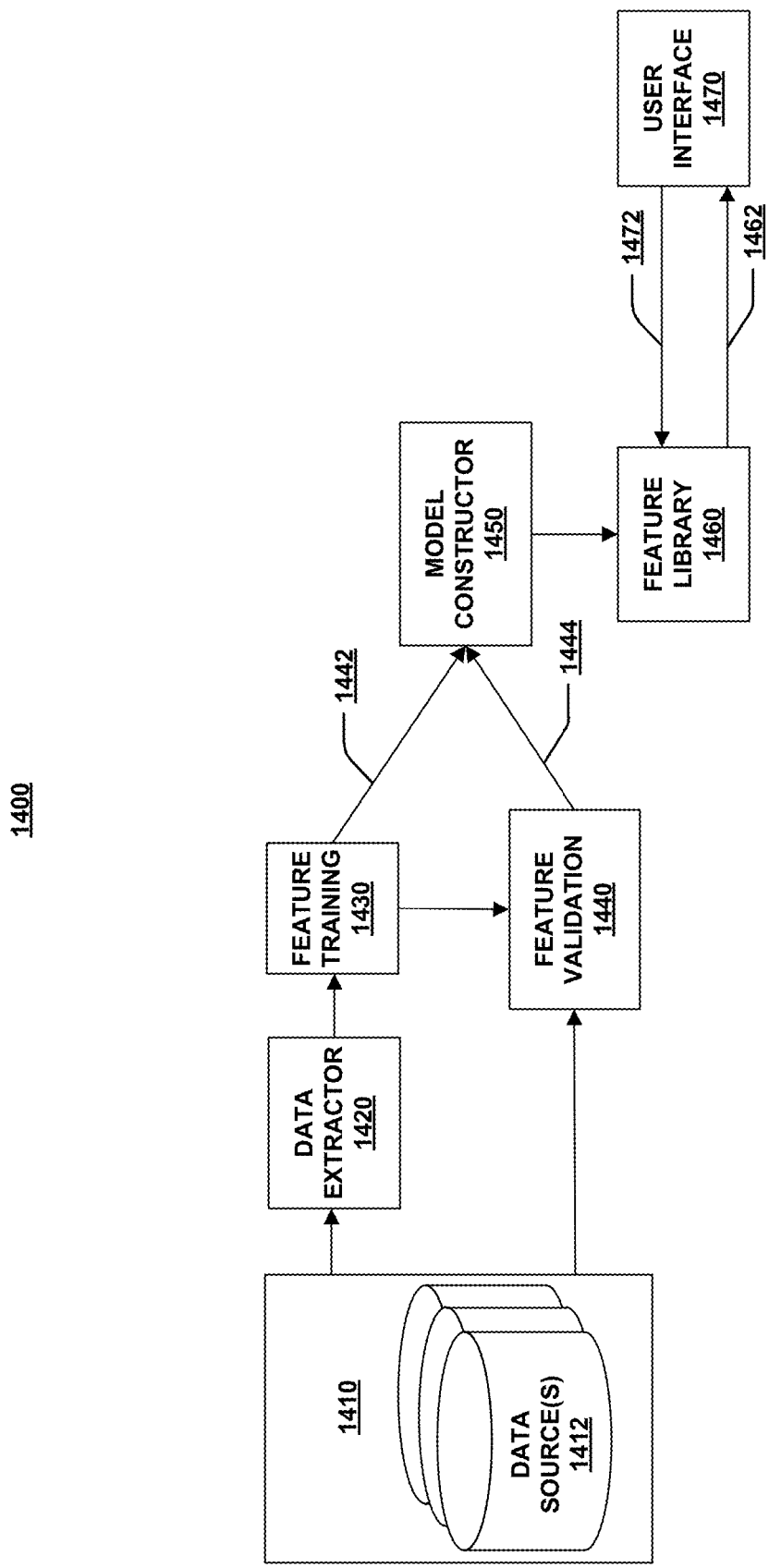
FIG. 14 shows a block diagram consistent with embodiments of the present disclosure.

FIG. 14 shows a block diagram of an exemplary trend analysis system environment 1400 consistent with embodiments of the present disclosure. System environment 1400 may be used in a variety of fields and applications. For example, system environment 1400 may be used to determine a recommended product to a consumer, or predict the occurrence of an event.

System environment 1400 may include storage 1410, which may include one or more data source(s) 1412. Data source 1412 may include one or more servers, databases, memories, or other storage devices. Moreover, data sources 1412 may be configured as cloud storage. For example, data sources 1412 may include one or more data sources located at different locations accessible and readable/writable via a network.

Data source 1412 may include a decennial census database, housing affordability database, and existing real estate sales database. Further data source 1412 may include an employment status database, regional economic status database, and other dataset database. Other databases may also/instead be included in storage 1410 depending on the application that system environment 1400 is applied to. For example, storage 1410 may include data sources that include product sale data, trend data regarding product sales, and demographic data related to product sales.

Relevant data from data source 1412 may be extracted from storage 1410 by data extractor 1420. For example, relevant data may be data included in data source 1412 that is calculated as pertinent to the recommendation performed by system environment 1400, and may be extracted. Other data deemed unnecessary to the recommendation processing of system environment 1400 may not be extracted from data source 1412.

Relevant data extracted by data extractor 1420 may then be provided to feature training 1430. Here, the relevant data may be collected and one or more feature libraries may be populated with the relevant data. Distributed data processing and machine learning by one or more computing devices may then be performed based on the relevant information to determine a recommendation, with features of the information analyzed. The machine learning may find coherences between factors present in relevant data. Moreover, dominant factors that are determined to have a greater impact in the recommendation provided by system environment 1400 may be determined. Knowledge base refinement may also be performed, where the dominant factors may be adjusted, removed if data indicates those factors are no longer dominant, and new dominant factors determined when formerly non-dominant factors are now determined to be dominant. Selected features 1442 may be generated from the dominant factors and the coherences of the relevant data by feature training 1430. Selected features 1442 may then be provided to model constructor 1450. Selected features 1442 may be automatically selected, or may be manually selected, and provided to model constructor 1450 to generate a model. For example, when selected features 1442 are manually selectable, the selected features 1442 may be selected by a user from a feature library. Manually selecting selected features 1442 may allow a user to generate models using their own proprietary knowledge, which in some cases may be in contrast to features automatically selected and/or validated.

Data from data source 1412 may also be provided to feature validation 1440. Features calculated as dominant by feature training 1430, as well as other features determined via machine learning by feature training 1430, may be provided to feature validation 1440. Feature validation 1440 may then determine which ones of the extracted features are validated, and may provide validated features 1444 to model constructor 1450.

Model constructor 1450 may include one or more models, such as a generic model, a regional model, and a domain specific model. Model constructor may utilize one or more models to analyze the selected features 1442 and the validated features 1444. Model constructor 1450 may then generate a prediction model based on the one or more models it includes, and the selected features 1442 and the validated features 1444. Model constructor 1450 may then generate a prediction or recommendation from the prediction model, and populate one or more feature libraries 1460 with the prediction or recommendation.

Feature library 1460 may provide the prediction or recommendation to user interface 1470 as a result 1462. User interface 1470 may provide an output of the result 1462, and a recommendation. For example, user interface 1470 may provide a web browser interface that shows dominant result 1462, and a prediction, such as a regional real-estate market prediction. The prediction may be displayed hierarchically, wherein further details of the prediction may be interacted with and adjusted to provide new predictions. Query parameters 1472 may be further provided to the feature library via the user interface 1470. For example, query parameters 1472 may include requests for further processing with different selected features 1442 and/or different validated features 1444. Moreover, query parameters 1472 may include user inputs such as location, desired price, listing price, price range, salary, expected salary, and the like that may be input via user interface 1470, and communicated to feature library 1460. Such inputs may be used to alter the predictions provided by model constructor 1450.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system for selecting a model to process real-time sensor data, comprising:
   a memory device that stores a set of instructions; and
   at least one processor that executes the instructions to:
   receive real-time input signals from one or more sensors in an environment;
   determine that the input signals are associated with a complex profile, the complex profile including at least one subset of data representing information about an actor gathered from a plurality of databases, the complex profile being updated in real-time from the plurality of databases and iteratively updated accordingly;
   determine one or more capabilities of a system to process the input signals;
   determine a speed associated with a desired processing of the input signals;
   select one of a plurality of models based on the one or more capabilities and the determined speed, the one or more capabilities comprising at least one of storage capacity or processing power;
   process the input signals by the selected one of the plurality of models to determine an experience associated with the actor; and
   apply the determined experience to a device associated with the actor.

2. The system of claim 1, wherein the plurality of models differ in at least one of how certain characteristics of input signals are weighted or how certain types of input signals are processed.

3. The system of claim 1, wherein selecting one of a plurality of models is further based on a type of data corresponding to the input signal.

4. The system of claim 1, wherein selecting one of a plurality of models is further based on user input.

5. The system of claim 1, wherein selecting one of a plurality of models is further based on a desired level of anonymity.

6. The system of claim 1, wherein selecting one of a plurality of models is further based on lossiness of the input signals.

7. The system of claim 1, wherein selecting one of a plurality of models is further based on a desired level of confidence of identifying the actor from the input signals.

8. The system of claim 1, wherein the at least one processor further requests additional input signals based on a likelihood of identifying the actor from the input signals.

9. The system of claim 1, wherein the one or more sensors comprise one or more of a camera, a microphone, or a user device.

10. A method for selecting a model to process real-time sensor data, comprising:
    receiving real-time input signals from one or more sensors in an environment;
    determining that the input signals are associated with a complex profile, the complex profile including at least one subset of data representing information about an actor gathered from a plurality of databases, the complex profile being updated in real-time from the plurality of databases and iteratively updated accordingly;
    determining one or more capabilities of a system to process the input signals, wherein the one or more capabilities comprise at least one of storage capacity or processing power;
    determining a speed associated with a desired processing of the input signals;
    selecting one of a plurality of models based on the one or more capabilities and the determined speed;
    processing the input signals by the selected one of the plurality of models to determine an experience associated with the actor; and
    applying the determined experience to a device associated with the actor.

11. The method of claim 10, wherein the plurality of models differ in at least one of how certain characteristics of input signals are weighted or how certain types of input signals are processed.

12. The method of claim 10, wherein selecting one of a plurality of models is further based on a type of data corresponding to the input signal.

13. The method of claim 10, wherein selecting one of a plurality of models is further based on user input.

14. The method of claim 10, wherein selecting one of a plurality of models is further based on a desired level of anonymity.

15. The method of claim 10, wherein selecting one of a plurality of models is further based on lossiness of the input signals.

16. The method of claim 10, wherein selecting one of a plurality of models is further based on a desired level of confidence of identifying the actor from the input signals.

17. The method of claim 10, further comprising requesting additional input signals based on a likelihood of identifying the actor from the input signals.

18. A non-transitory computer readable medium storing one or more programs, the one or more programs comprising instructions which, when executed by a processor of a computer system, cause the computer system to perform a method, comprising:

receiving real-time input signals from one or more sensors in an environment;

determining that the input signals are associated with a complex profile, the complex profile including at least one subset of data representing information about an actor gathered from a plurality of databases, the complex profile being updated in real-time from the plurality of databases and iteratively updated accordingly;

determining one or more capabilities of a system to process the input signals, wherein the one or more capabilities comprise at least one of storage capacity or processing power;

determining a speed associated with a desired processing of the input signals;

selecting one of a plurality of models based on the one or more capabilities and the determined speed;

processing the input signals by the selected one of the plurality of models to determine an experience associated with the actor; and applying the determined experience to a device associated with the actor.

19. The system of claim 1, wherein the plurality of models are stored in an appliance comprising the at least one processor, or a cloud connected to the appliance.

20. The method of claim 10, further comprising:

storing the plurality of models in an appliance, or a cloud connected to the appliance.

* * * * *